United States Patent
Sarath et al.

(10) Patent No.: US 12,549,433 B2
(45) Date of Patent: Feb. 10, 2026

(54) SYSTEM AND METHOD TO REDUCE NETWORK FUNCTION INTERRUPTIONS IN A SERVICE-BASED ARCHITECTURE

(71) Applicant: DISH Wireless L.L.C., Englewood, CO (US)

(72) Inventors: Arjun Sarath, Littleton, CO (US); Mohammad Dawood Shahdad, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 222 days.

(21) Appl. No.: 18/326,828

(22) Filed: May 31, 2023

(65) Prior Publication Data

US 2024/0406056 A1    Dec. 5, 2024

(51) Int. Cl.
*H04W 24/00* (2009.01)
*H04L 41/0654* (2022.01)
(Continued)

(52) U.S. Cl.
CPC ...... *H04L 41/0654* (2013.01); *H04L 43/0811* (2013.01); *H04L 67/141* (2013.01)

(58) Field of Classification Search
None
See application file for complete search history.

(56) References Cited

U.S. PATENT DOCUMENTS 9,197,517 B2    11/2015    Ravichandran et al.
9,438,745 B2    9/2016     Adimatyam et al.
(Continued)

FOREIGN PATENT DOCUMENTS

WO    2022083867 A1    4/2022
WO    2022212158 A1    10/2022

OTHER PUBLICATIONS

PCT International Search Report and Written Opinion of the International Searching Authority, or the Declaration for International Application No. PCT/US2024/030459, date of mailing Nov. 6, 2024 (Nov. 6, 2024), 22 pages.
(Continued)

*Primary Examiner* — Christopher B Robinson
(74) *Attorney, Agent, or Firm* — Baker Botts L.L.P.

(57) ABSTRACT

An apparatus is configured to communicate with multiple network components in a service-based architecture and comprises a memory and a processor. The memory stores multiple configuration commands. The processor is configured to generate a request to establish a communication session between a first network component, a second network component, and a third network component. The first network component exchanges connectivity signals with the second network component and the third network component. The second network component performs first plurality of session operations in response to the connectivity signals exchanged with the first network component. The second network component reports to the third network component that the first session operations are performed. The processor is further configured to, in response to determining that the communication session between the first network component and the second network component is lost, maintain the communication session between the first network component and the third network component.

20 Claims, 9 Drawing Sheets

(51) Int. Cl.
    *H04L 43/0811*    (2022.01)
    *H04L 67/141*     (2022.01)

(56) References Cited

U.S. PATENT DOCUMENTS

| | | | |
|---|---|---|---|
| 9,722,873 | B2 | 8/2017 | Zhu et al. |
| 10,171,383 | B2 | 1/2019 | Johnston et al. |
| 10,411,947 | B2 | 9/2019 | Rangasamy et al. |
| 10,579,367 | B2 | 3/2020 | Lander et al. |
| 11,076,376 | B2 | 7/2021 | Youn et al. |
| 11,356,454 | B2 | 6/2022 | Gupta et al. |
| 11,419,046 | B2 | 8/2022 | Fiorese et al. |
| 11,533,401 | B2 | 12/2022 | Qiao et al. |
| 11,601,411 | B2 | 3/2023 | Gupta et al. |
| 2004/0095923 | A1* | 5/2004 | Ejzak ............... H04L 41/34 370/352 |
| 2014/0149593 | A1* | 5/2014 | Brownworth ....... H04W 36/302 709/227 |
| 2016/0088093 | A1* | 3/2016 | Yung ................. H04L 67/145 709/227 |
| 2020/0178048 | A1 | 6/2020 | Kim et al. |
| 2020/0305118 | A1 | 9/2020 | Ryu et al. |
| 2021/0105196 | A1 | 4/2021 | Dao et al. |
| 2021/0385744 | A1 | 12/2021 | Wu et al. |
| 2022/0014944 | A1 | 1/2022 | Liang et al. |
| 2022/0046731 | A1 | 2/2022 | Fard et al. |
| 2022/0070815 | A1 | 3/2022 | Chun |
| 2022/0124159 | A1 | 4/2022 | Nagy et al. |
| 2022/0159605 | A1 | 5/2022 | Li et al. |
| 2022/0174539 | A1 | 6/2022 | Dao et al. |
| 2022/0417122 | A1 | 12/2022 | Chou et al. |

OTHER PUBLICATIONS

PCT Partial Search Report and Invitation to Pay Additional Fees for PCT International Application No. PCT/US2024/030459, Date of Mailing Sep. 12, 2024 (Sep. 12, 2024), 16 pages.

Shahdad, Mohammad Dawood, System And Method To Reduce Network Function Interruptions In A Service-Based Architecture, U.S. Appl. No. 18/326,803, filed May 31, 2023.

Sarath, Arjun, System And Method To Reduce Database Interruptions In A Service-Based Architecture, U.S. Appl. No. 18/326,858, filed May 31, 2023.

* cited by examiner

SYSTEM AND METHOD TO REDUCE NETWORK FUNCTION INTERRUPTIONS IN A SERVICE-BASED ARCHITECTURE

TECHNICAL FIELD

The present disclosure relates generally to operation of a communication system in a service-based architecture, and more specifically to a system and a method to reduce or to prevent network function interruptions in the service-based architecture.

BACKGROUND

In some wireless communications systems, groups of network components may be configured to perform specific Network Functions (NFs) in a network. Further, each network component may be configured to perform multiple communication transmissions across the network in accordance with routing and configuration information provided by a repository. The repository is connected to a database that stores the routing and configuration information for the groups of network components.

In the event of a repository interruption in which the repository loses at least partial connection to the network, the group of network components is cut off from the routing and configuration information provided by the repository. In this regard, the group of network components is unable to perform any communication transmissions across the network because the repository is unable to communicate the routing and configuration information to the group of network components. Previous technologies fail to provide reliable solutions to reduce or to prevent repository interruptions when the repository is unable to communicate with the network. As a result, repository interruptions currently lead to large periods of downtime for the entire network.

In the event of a database interruption in which the database loses at least partial connection to the network, the group of network components is cut off from the routing and configuration information stored in the database. In this regard, the group of network components is unable to perform any communication transmissions across the network because the repository is unable to access the routing and configuration information from the database. Previous technologies fail to provide reliable solutions to reduce or to prevent database interruptions when the database is unable to communicate with the network. As a result, database interruptions currently lead to large periods of downtime for the entire network.

SUMMARY OF THE DISCLOSURE

In one or more embodiments, a system and a method described herein provide several practical applications and technical advantages that overcome current technical problems in wireless communication technology. In particular, the system and the method are integrated into multiple practical applications improving speed, quality, and reliability of wireless communications systems. In some embodiments, wireless communication systems comprise one or more network components configured to perform specific Network Functions (NFs) in a network. The network may comprise a Service-Based Architecture (SBA). Further, each network component may be configured to perform multiple communication transmissions across the network in accordance with routing and configuration information provided by a specific network component performing a Network Repository Function (NRF). The specific network component may be communicatively coupled to a specific database that stores the routing and configuration information for the one or more of network components.

In some embodiments, the system and the method provide reliable solutions to reduce or to prevent communication interruptions to the NRF when one or more specific network functions attempt to reach the NRF or when the specific network component performing the NRF is unable to communicate with the network (hereinafter referred to as NRF interruptions). As a result, the speed, quality, and reliability of wireless communications systems are improved by reducing, preventing, or eliminating periods of downtime for the entire network. For example, in the event of an NRF interruption in which the specific network component loses at least partial connection to the network, the system and the method reduce, prevent, or eliminate any additional network components to be cut off from the routing and configuration information stored in the database the group of network components is cut off from the routing and configuration information provided by the specific network. In this regard, the system and the method enable the additional network components to perform any communication transmissions across the network because the specific network component or a backup network component is able to communicate the routing and configuration information to the group of network components with no or little downtime despite any NRF interruptions.

In other embodiments, the system and the method provide reliable solutions to reduce or to prevent database interruptions when the specific database associated with the specific network component performing the NRF is unable to communicate with the network. As a result, the speed, quality, and reliability of wireless communications systems are improved by reducing, preventing, or eliminating periods of downtime for the entire network. For example, in the event of a database interruption in which the database loses at least partial connection to the network, the system and the method reduce, prevent, or eliminate any additional network components to be cut off from the routing and configuration information stored in the database. In this regard, the system and the method enable the additional network components to perform any communication transmissions across the network because the specific network component is able to access the routing and configuration information from a backup database with no or little downtime despite any database interruptions.

Reducing Network Function Interruptions

In one or more embodiments, the system and the method disclosed herein reduce network function interruptions in the network comprising the SBA. In particular, the system and the method provide a specific network component performing the NRF as part of the SBA. In performing the NRF, the specific network component maintains NF profiles and corresponding configuration operations in the network. In some embodiments, the specific network component is communicatively coupled with a specific database that comprises routing and connections associated with every NF in the SBA. In this regard, the specific network component may be configured to provide routing and configuring information for other network components to establish initial communication sessions between two or more network components. Further, the specific network component may be configured to provide backup routing and configuring information for the other network components to establish backup communication sessions between the two or more network components.

In one or more embodiments, the system and the method are configured to reduce NRF interruptions by establishing backup communication sessions in the event that an initial communication session is lost. In some embodiments, the NRF interruptions are events in which the NRF cannot be performed in relation to the network. For example, the NRF interruptions may comprise that the specific network component is disconnected from the SBA or that the specific network component is unable to continue performing the NRF. To identify an NRF interruption in the network, the system and the method may be configured to identify that certain connectivity signals are not received from the specific network component. If the certain connectivity signals are not received, then the system and the method may be configured to determine that the NRF interruption occurred. Upon identifying the NRF interruption in the network, the system and the method may be configured to execute a script that automatically establishes backup communication sessions where initial communication sessions are lost. The backup communication sessions may be established using local provisioning parameters that are backup copies of configuration commands used to establish the initial communication sessions. In some embodiments, the system and the method may dynamically update the local provisioning parameters any time a new configuration command is generated via the NRF. In other embodiments, the system and the method may dynamically or periodically update the local provisioning parameters over time.

In one or more embodiments, the system and the method described herein are integrated into a practical application to reduce NRF interruptions in the SBA. In this regard, the system and the method are integrated into a practical application of providing local provisioning parameters to establish backup communication sessions that replace initial communication sessions that are determined to be lost in an NRF interruption. In particular, the system and the method provide a script that automatically replaces lost communication sessions with new communication sessions such that downtime is severely reduced in the SBA upon determining NRF interruptions.

In addition, the system and method described herein are integrated into a technical advantage of increasing processing speeds in a computer system in the SBA, because processors associated with the system and the method comprise scripts that automatically reestablish communication sessions in between network components. In the scripts, the system and the method may provide local provisioning parameters that replace configuration commands for routing and configuring communications of the network components. As a result, processing speed is increased because the system and the method may be automatically configured with the local provisioning instead of waiting for initial communication sessions to be reestablished using the configuration commands or estimating possible alternative configuration commands to reestablish the initial communication sessions. Under these improvements, the system and the method provide a practical application of maintaining operations in the network for longer periods of time by reducing downtime caused by NRF interruptions.

In one or more embodiments, the system and the method may be performed by an apparatus, such as a server, communicatively coupled to multiple network components in the SBA. Further, the system may be a wireless communication system, that comprises the apparatus. In addition, the system and the method may be performed as part of a process performed by the apparatus communicatively coupled to the network components in the SBA. As a non-limiting example, the apparatus may comprise a memory and a processor. The memory is configured to store multiple configuration commands, multiple local provisioning parameters, and a configuration scripts. The configuration commands may be configured to establish one or more initial communication sessions between two or more network components of the network components. The local provisioning parameters may be configured to establish one or more backup communication sessions. Each local provisioning parameter may be a backup copy of a corresponding configuration command. The configuration script may be configured to instruct the network components to establish the one or more initial communication sessions based at least in part upon the local provisioning parameters. The processor may be communicatively coupled to the memory and configured to generate a first request to establish an initial communication session between a first network component of the plurality of network components and a second network component of the plurality of network components. The processor may be configured to establish the initial communication session between the first network component and the second network component based at least in part upon a first configuration command of the configuration commands; determine that the initial communication session is lost based at least in part upon identifying an interruption in the initial communication session; and in response to determining that the initial communication session is lost, execute the configuration script to instruct the first network component to establish a backup communication session based at least in part upon a first local provisioning parameter of the local provisioning parameters.

Further Reducing Network Function Interruptions

In one or more embodiments, the system and the method disclosed herein reduce, prevent, or eliminate network function interruptions in the network comprising the SBA. In particular, the system and the method provide a primary network component or a secondary (e.g., backup) network component performing the NRF as part of the SBA. In performing the NRF, the primary network component maintains NF profiles and corresponding configuration operations in the network. In some embodiments, the primary network component provides a copy of operations related to maintaining the NF profiles to the secondary network component. The primary network component and the backup network component may be communicatively coupled with a specific database that comprises routing and connections associated with every NF in the SBA. In this regard, the primary network component may be configured to provide routing and configuring information for other network components to establish communication sessions between two or more network components. Further, the secondary network component may be configured to provide backed up routing and configuring information for other network components to establish communication sessions between two or more network components if the primary network component is not available due to an NRF interruption. As a result, the secondary network component may be configured to provide backup routing and configuring information to establish communication sessions between the two or more network components.

In one or more embodiments, the system and the method are configured to reduce, prevent, or eliminate NRF interruptions by controlling backup network components to reestablish or maintain communication sessions in the event that a given communication session is lost. In some embodiments, the NRF interruptions are events in which the NRF cannot be performed in relation to the network. For example, the NRF interruptions may comprise that the primary network component is disconnected from the SBA or that the primary network component is unable to continue performing the NRF. To identify an NRF interruption in the network, the system and the method may be configured to identify that certain connectivity signals are not received from the primary network component. If the certain connectivity signals are not received, then the system and the method may be configured to determine that the NRF interruption occurred. Upon identifying the NRF interruption in the network, the system and the method may be configured to maintain a communication session with the secondary network component even if the communication session with the primary network component is lost.

The secondary network component may be a backup network component that establishes a communication session with other network components at a same time the primary network component establishes a corresponding communication session. In this regard, the primary network component and the secondary network component may establish individual communication sessions with a given network component. Further, the primary network component and the secondary network component may establish a communication link to copy operations from the primary network component to the secondary network component. In the event that the communication session is lost between the primary network component and the given network component, the secondary network component maintains the corresponding communication session with the given network component. As a result, the given network component may not experience any effects caused by the NRF interruptions. In some embodiments, the primary network component may dynamically update the NRF operations to the secondary network component. In other embodiments, the primary network component may periodically update the NRF operations to the secondary network component.

In one or more embodiments, the system and the method described herein are integrated into a practical application to reduce, prevent, or to eliminate NRF interruptions in the SBA. In this regard, the system and the method are integrated into a practical application of providing a backup network component configured to perform any or all operations associated with the primary network component when communications with the primary network component are determined to be lost in an NRF interruption. In particular, the system and the method provide backup routing and configurations via the secondary network component in response to losing connectivity with the primary network component such that downtime is severely reduced in the SBA upon determining NRF interruptions associated with the primary network component.

In addition, the system and method described herein are integrated into a technical advantage of increasing processing speeds in a computer system in the SBA, because processors associated with the system and the method comprise automatically transitioning from the primary network component to the secondary network component when connectivity to the primary network component is lost. In some embodiments, the system and the method comprise the secondary network component to provide backup routing and configuring information of the network components. As a result, processing speed is increased because the system and the method may automatically provide the routing and configuring information to any network components in the network instead of awaiting to reestablish new communication sessions or estimating possible alternative configuration commands to reestablish the communication sessions.

Under these improvements, the system and the method provide a practical application of maintaining operations in the network for longer periods of time by reducing, preventing, or eliminating downtime caused by NRF interruptions.

In one or more embodiments, the system and the method may be performed by an apparatus, such as a server, communicatively coupled to multiple network components in the SBA. Further, the system may be a wireless communication system, that comprises the apparatus. In addition, the system and the method may be performed as part of a process performed by the apparatus communicatively coupled to the network components in the SBA. As a non-limiting example, the apparatus may comprise a memory and a processor. The memory is configured to store multiple configuration commands configured to establish one or more communication sessions between two or more network components of the network components. The processor may be communicatively coupled to the memory and configured to generate a request to establish a communication session between a first network component, a second network component, and a third network component. The processor may be configured to establish the communication session between the first network component, the second network component, and the third network component based at least in part upon a first configuration command of the configuration commands. Concurrently with the communication session, the first network component may exchange first connectivity signals with the second network component and the third network component; the second network component may perform first session operations in response to the first plurality of connectivity signals exchanged with the first network component; and the second network component may report to the third network component that the first session operations are performed. In addition, the processor may be configured to determine whether the communication session is lost between the first network component and the second network component based at least in part upon identifying an interruption in the communication session; and in response to determining that the communication session between the first network component and the second network component is lost, maintain the communication session between the first network component and the third network component.

Reducing Database Interruptions

In one or more embodiments, the system and the method disclosed herein reduce, prevent, or eliminate database interruptions in the network comprising the SBA. In particular, the system and the method provide a primary database or a secondary (e.g., backup) database performing database operations as part of the SBA. In performing the database operations, the primary database stores and provides NF profiles and corresponding configuration commands in the network. In some embodiments, the primary database provides a copy of operations related to storing the NF profiles to the secondary database. The primary database and the backup database may be communicatively coupled with a specific network component that performs the NRF in the SBA. In this regard, the primary database may be configured to store or provide routing and configuring information for other network components to establish communication sessions between two or more network components. Further, the secondary database may be configured to store or provide backed up routing and configuring information for other network components to establish communication sessions between two or more network components if the primary database is not available due to a database interruption. As a result, the secondary database may be configured to store or provide backup routing and configuring information to establish communication sessions between the two or more network components.

In one or more embodiments, the system and the method are configured to reduce, prevent, or eliminate database interruptions by controlling backup databases to maintain information associated with communication sessions in the event that a given communication session is lost. In some embodiments, the database interruptions are events in which the database operations cannot be performed in relation to the network. For example, the database interruptions may comprise that the primary database is disconnected from the SBA or that the primary database is unable to continue storing information associated with the NRF. To identify a database interruption in the network, the system and the method may be configured to identify that certain database operations are not received from the primary database. If the certain database operations are not received, then the system and the method may be configured to determine that the database interruption occurred. Upon identifying the database interruption in the network, the system and the method may be configured to maintain a communication session with the secondary database even if the communication session with the primary database is lost.

The secondary database may be a backup database accessed via a communication session with a network component at a same time the primary database is accessed via a corresponding communication session. In this regard, the primary database and the secondary database may be accessed via individual communication sessions with a given network component. Further, the primary database and the secondary database may establish a communication link to copy operations from the primary database to the secondary database. In the event that the access is lost between the primary database and the given network component, the secondary database maintains the corresponding communication session with the given network component. As a result, the given network component may not experience any effects caused by the database interruptions. In some embodiments, the primary database may dynamically update the database operations to the secondary database. In other embodiments, the primary database may periodically update the database operations to the secondary database.

In one or more embodiments, the system and the method described herein are integrated into a practical application to reduce, prevent, or to eliminate database interruptions in the SBA. In this regard, the system and the method are integrated into a practical application of providing a backup database configured to perform any or all operations associated with the primary database when access to the primary database is determined to be lost in a database interruption. In particular, the system and the method provide storage of backup routing and configurations via the secondary database in response to losing connectivity with the primary database such that downtime is severely reduced in the SBA upon determining database interruptions associated with the primary database.

In addition, the system and method described herein are integrated into a technical advantage of increasing processing speeds in a computer system in the SBA, because processors associated with the system and the method comprise automatically transitioning from the primary database to the secondary database when access to the primary database is lost. In some embodiments, the system and the method comprise the secondary database to provide backup routing and configuring information of the network components. As a result, processing speed is increased because the system and the method may be immediately store or provide the routing and configuring information to any network components in the network instead of awaiting to reestablish new communication sessions for access or estimating possible alternative configuration commands to reestablish access to routing and configuration information. Under these improvements, the system and the method provide a practical application of maintaining operations in the network for longer periods of time by reducing, preventing, or eliminating downtime caused by database interruptions.

In one or more embodiments, the system and the method may be performed by an apparatus, such as a server, communicatively coupled to multiple network components in the SBA. Further, the system may be a wireless communication system, that comprises the apparatus. In addition, the system and the method may be performed as part of a process performed by the apparatus communicatively coupled to the network components in the SBA. As a non-limiting example, the apparatus may comprise a memory and a processor. The memory is configured to store multiple configuration commands configured to establish one or more communication sessions to access two or more databases of the plurality of databases. The processor may be communicatively coupled to the memory and configured to generate a request to establish a communication session in which a network component accesses a first database of the databases and a second database of the databases. The processor may be configured to establish the communication session to access the first database and the second database based at least in part upon a first configuration command of the configuration commands. Concurrently with the communication session, the network component exchanges first connectivity signals with the first database and the second database; the first database provides first database operations in response to the first connectivity signals exchanged with the network component; and the first database reports to the second database that the first database operations are provided. In addition, the processor may be configured to determine that the communication session is lost between the network component and the first database based at least in part upon identifying an interruption in the communication session; and in response to determining that the communication session between the network component and the first database is lost, maintain the communication session to access the second database.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide reliable solutions to reduce or to prevent Network Repository Function (NRF) interruptions when a network component performing NRF operations is unable to communicate with one or more network components in a network comprising a service-based architecture (SBA). In this regard, this disclosure provides various systems and methods to reduce or to prevent network function interruptions in the SBA. Further, as described above, previous technologies fail to provide reliable solutions to reduce or to prevent database interruptions when a database associated with the network component performing the NRF is unable to communicate with the network. In this regard, this disclosure provides various systems and methods to reduce or to prevent database interruptions in the SBA. These are solutions shown and described in reference to FIGS. 1-9.

Figure 1:
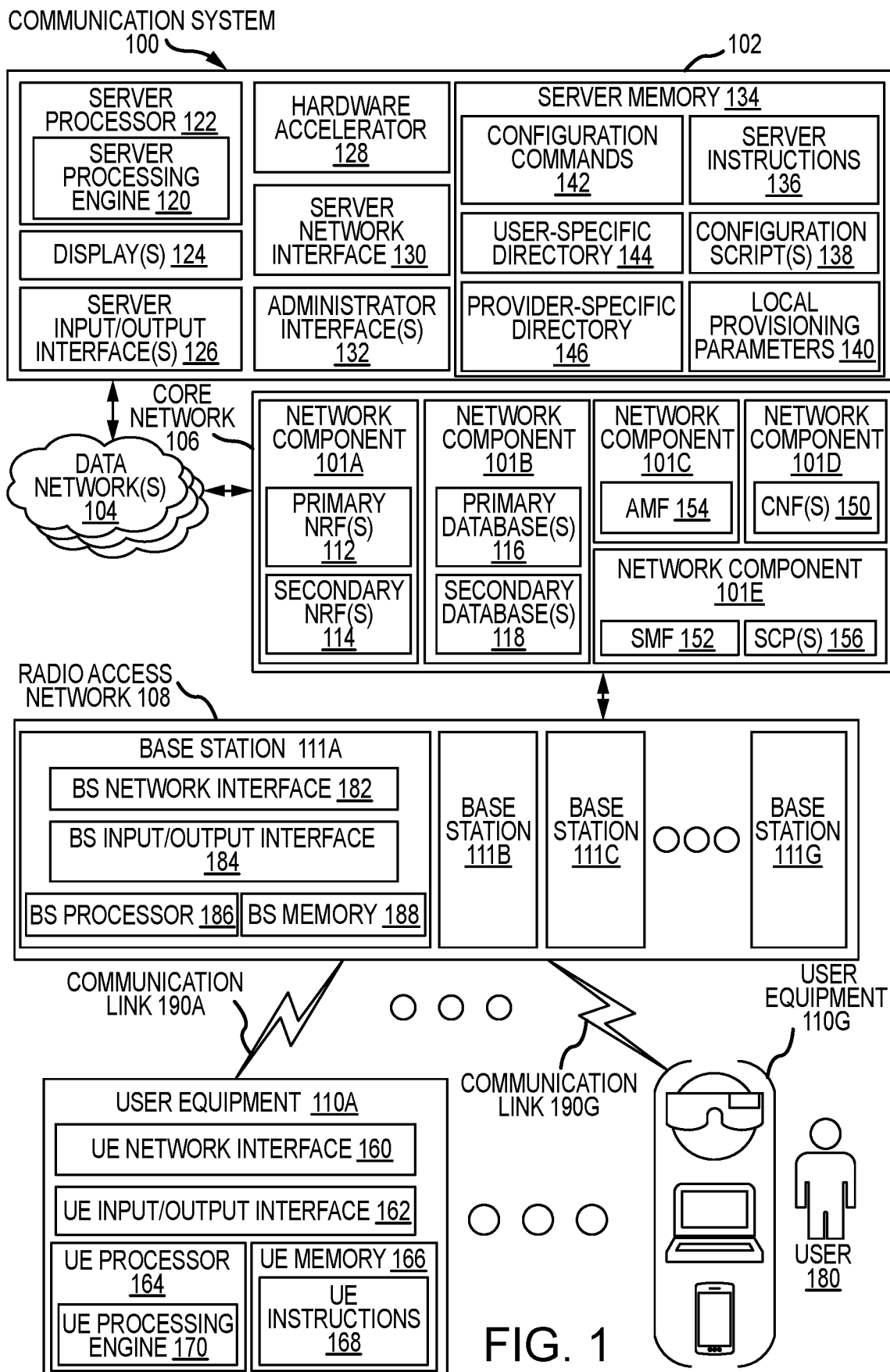
FIG. 1 illustrates an example communication system in accordance with one or more embodiments.
Figure 2:
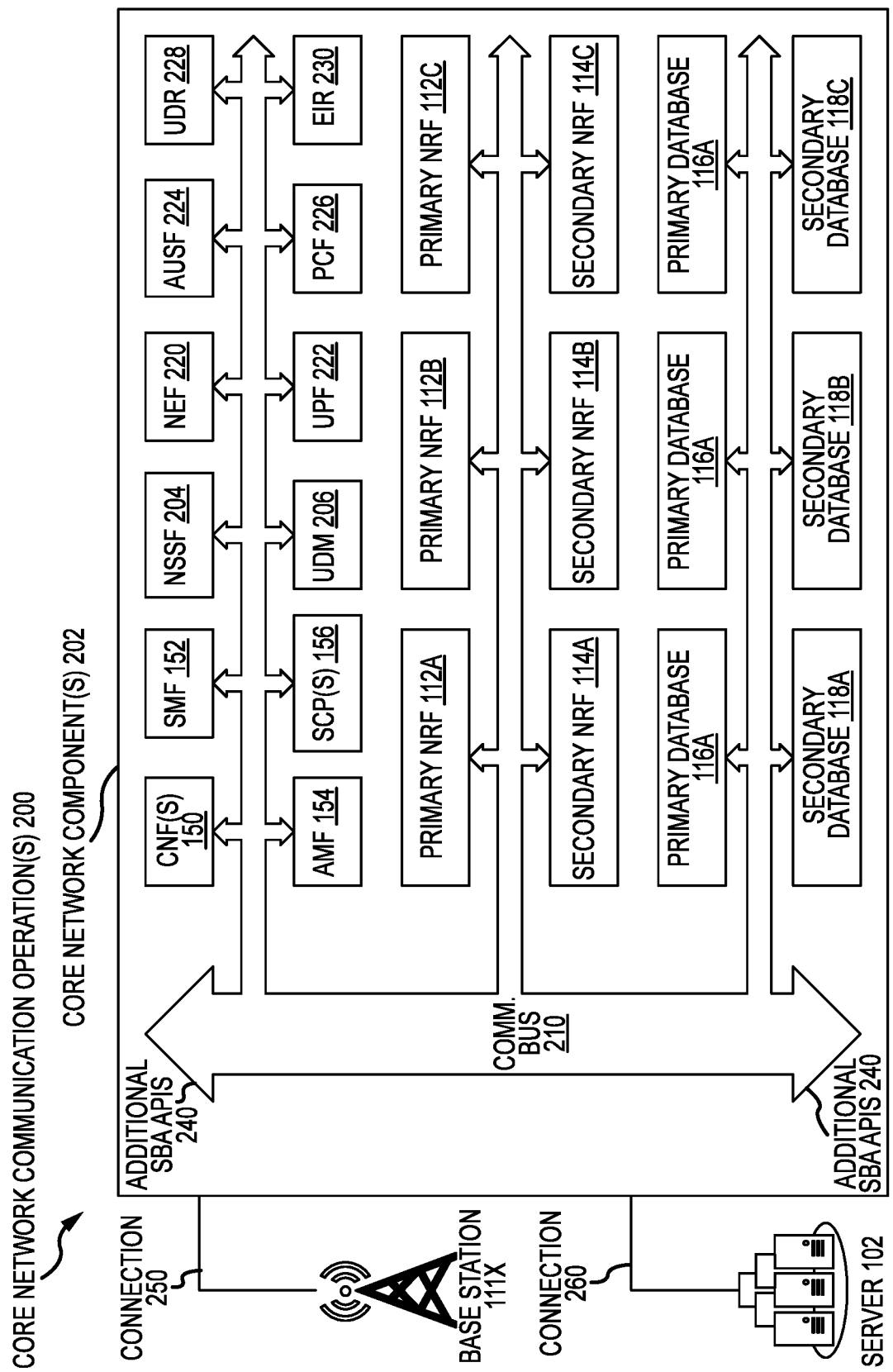
FIG. 2 illustrates examples of one or more core network communication operations performed in conjunction with the example communication system of FIG. 1.

In one or more embodiments, FIG. 1 illustrates a communication system 100 in which a server 102 configures communication operations between one or more data networks 104, a core network 106, a Radio Access Network (RAN) 108, and one or more user equipment 110A-110G. FIG. 2 illustrates one or more core network communication operations 200 in which one or more core network components 202 communicate with at least one base station 111X and the server 102 of FIG. 1.

Figure 3:
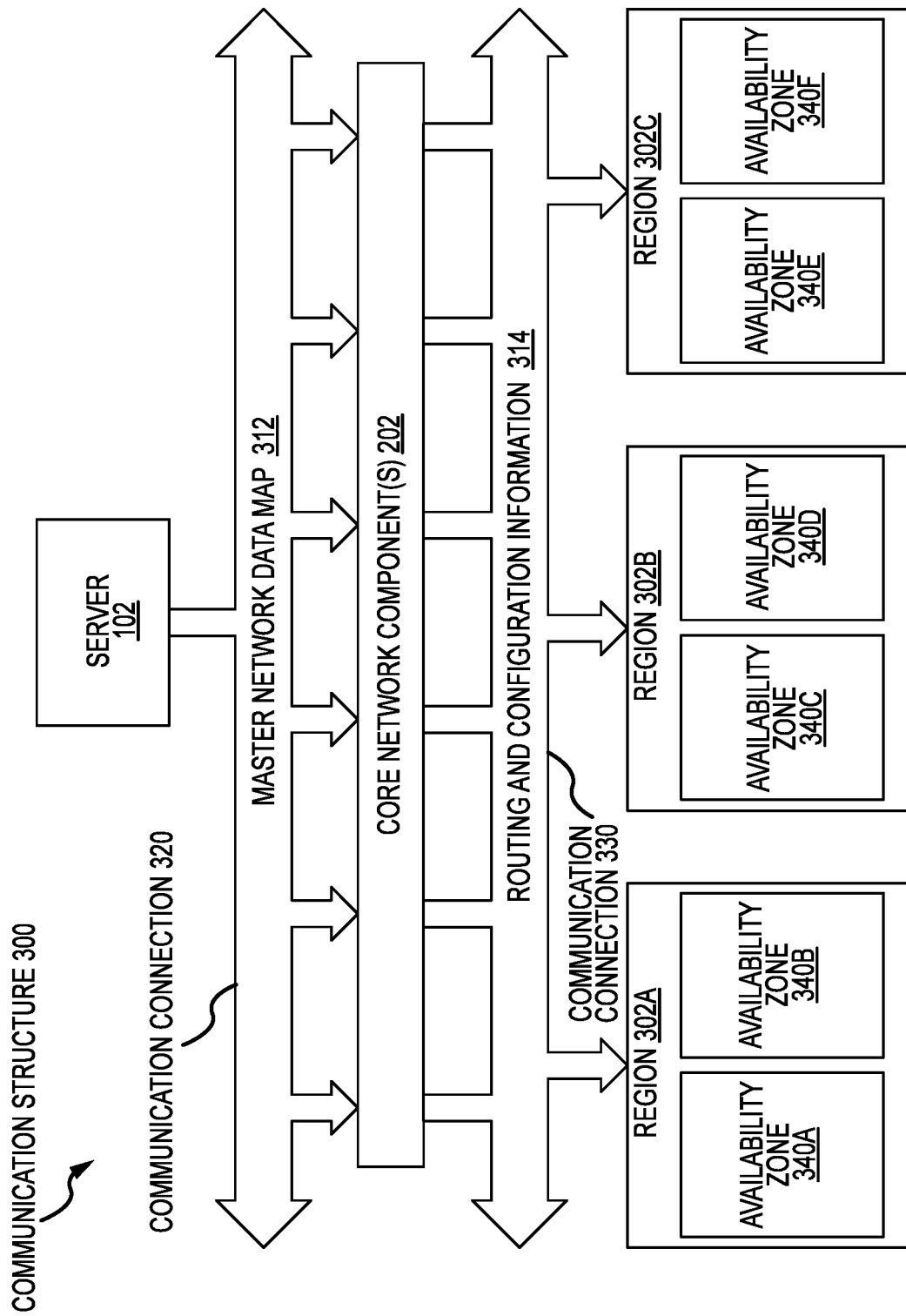
FIG. 3 illustrates an example communication structure to perform the one or more core network communication operations of FIG. 2.
Figure 4:
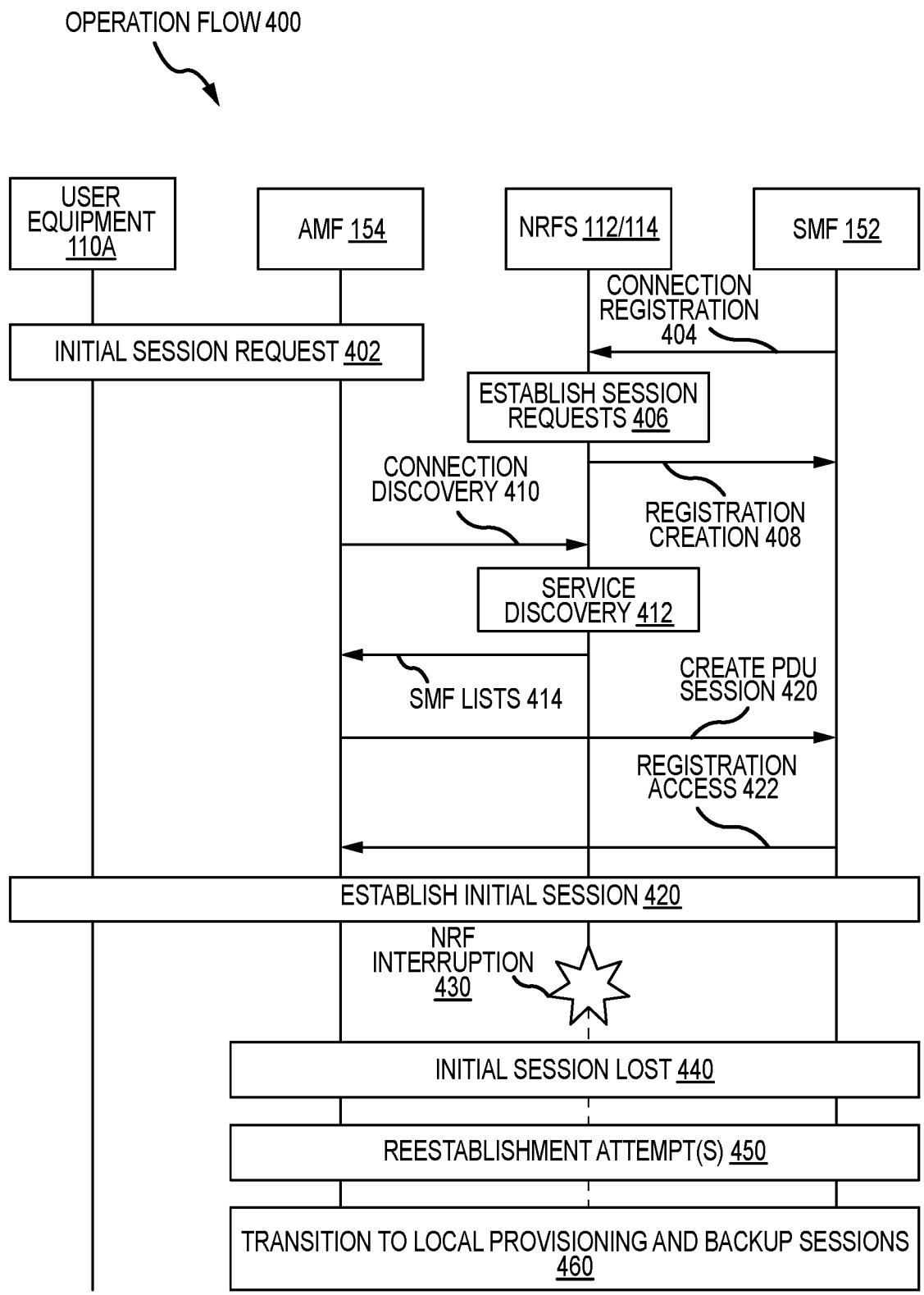
FIG. 4 illustrates an example operational flow to reduce network function interruptions in conjunction with the example communication system of FIG. 1 and the example communication architecture of FIG. 3.
Figure 5:
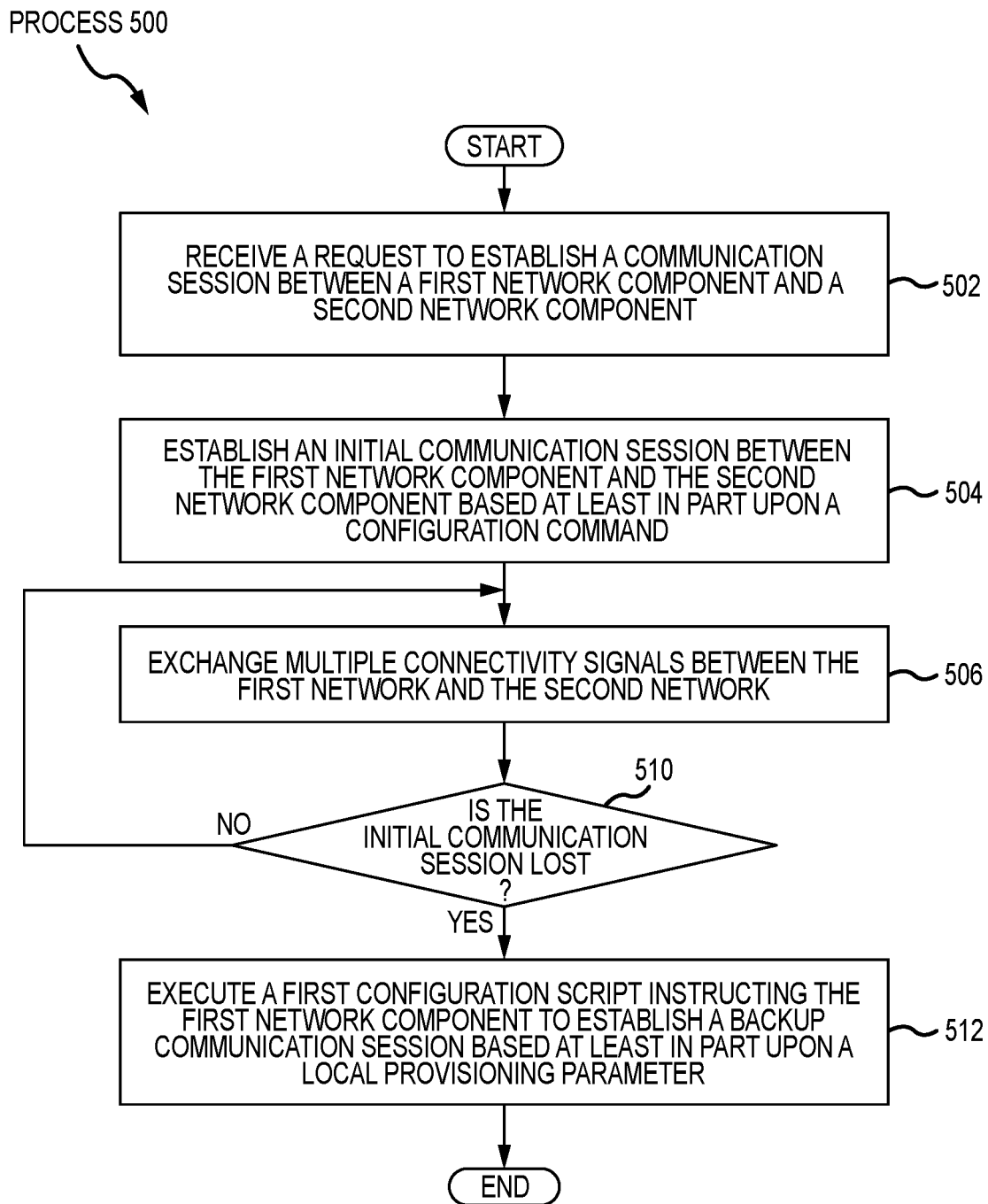
FIG. 5 illustrates an example flowchart of a method to reduce network function interruptions in conjunction with the operational flow of FIG. 4.

FIG. 3 illustrates a communication structure 300 between the server 102 of FIG. 1 and electronic devices in one or more communication regions 302A-302C. FIG. 4 illustrates an operational flow 400 in which NRF interruptions 402 are reduced when a given network component 101A performing NRF operations (e.g., one of the primary NRFs 112) is unable to communicate with one or more network components 101B-101E in the core network 106. FIG. 5 illustrates a first process 500 to perform one or more of operations associated with the server 102 of FIG. 1.

Figure 6:
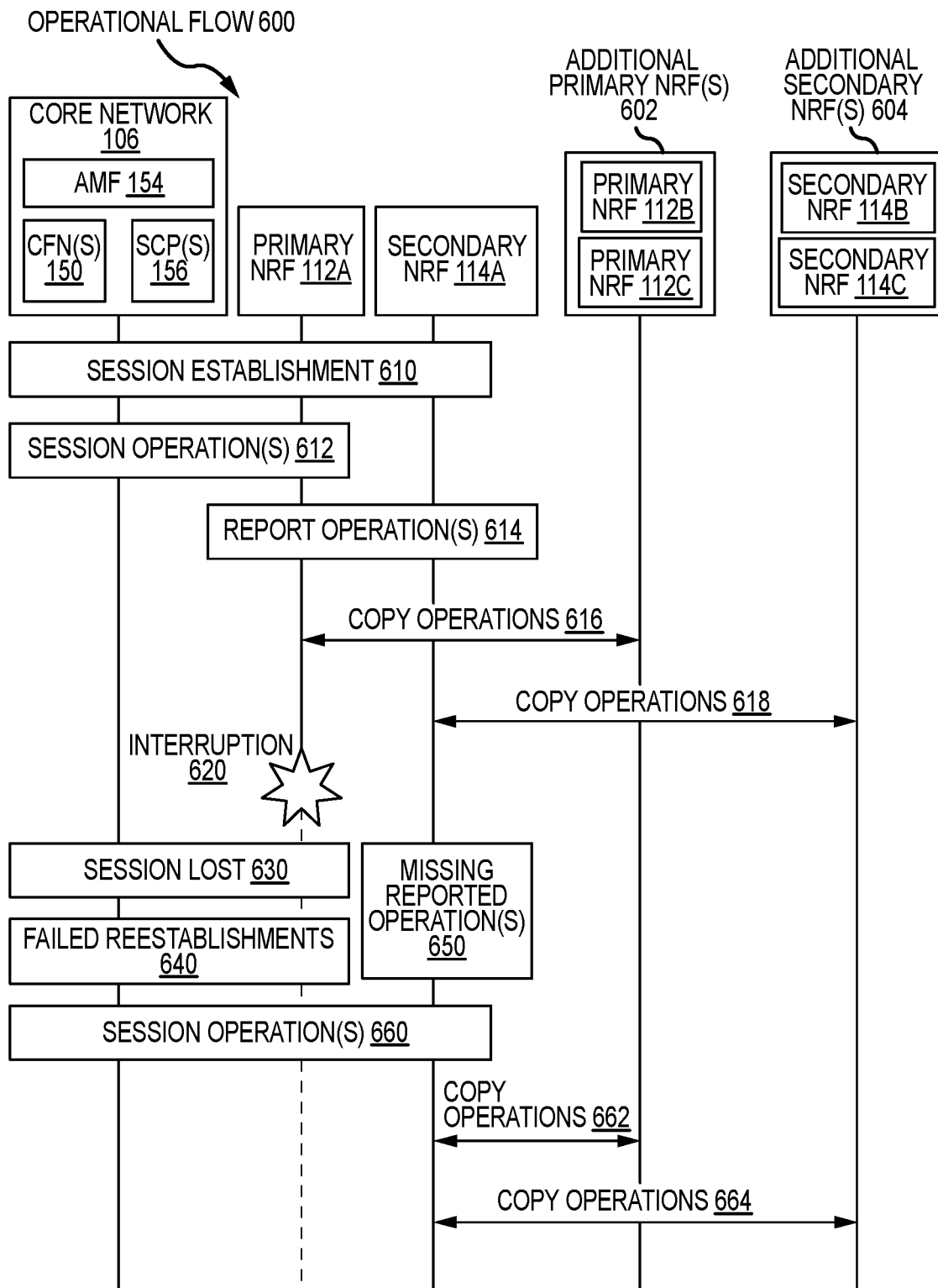
FIG. 6 illustrates an example operational flow to reduce network function interruptions in conjunction with the example communication system of FIG. 1.
Figure 7:
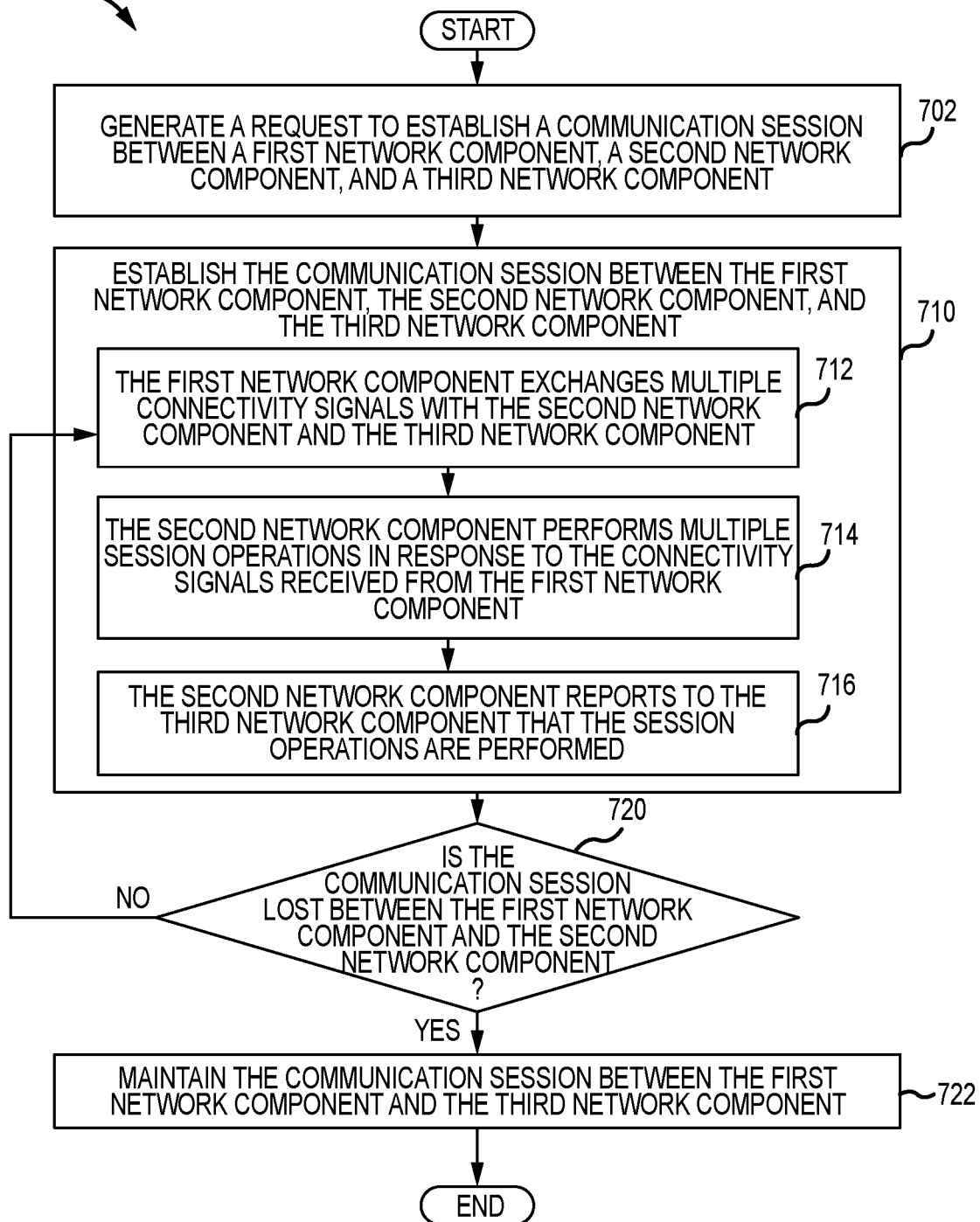
FIG. 7 illustrates an example flowchart of a method to reduce network function interruptions in conjunction with the operational flow of FIG. 6.

FIG. 6 illustrates an operational flow 600 in which NRF interruptions 602 are reduced when a given network component (e.g., any of the network components 101A-101E) performing NRF operations (e.g., primary NRF 112A) is unable to communicate with one or more network components 101A-101E in the core network 106. FIG. 7 illustrates a second process 700 to perform one or more operations associated with the server 102 of FIG. 1.

Figure 8:
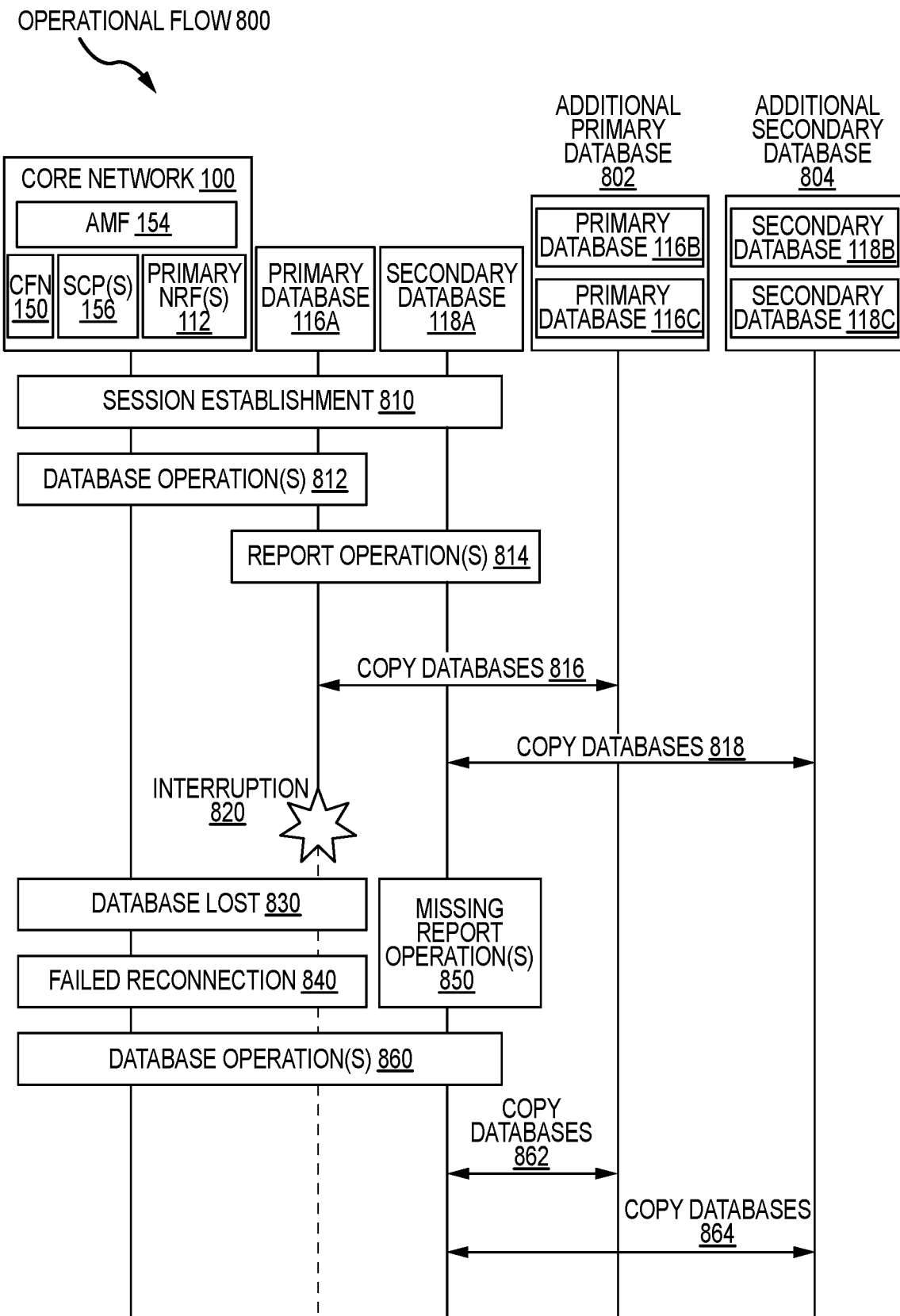
FIG. 8 illustrates an example operational flow to reduce database interruptions in conjunction with the example communication system of FIG. 1.
Figure 9:
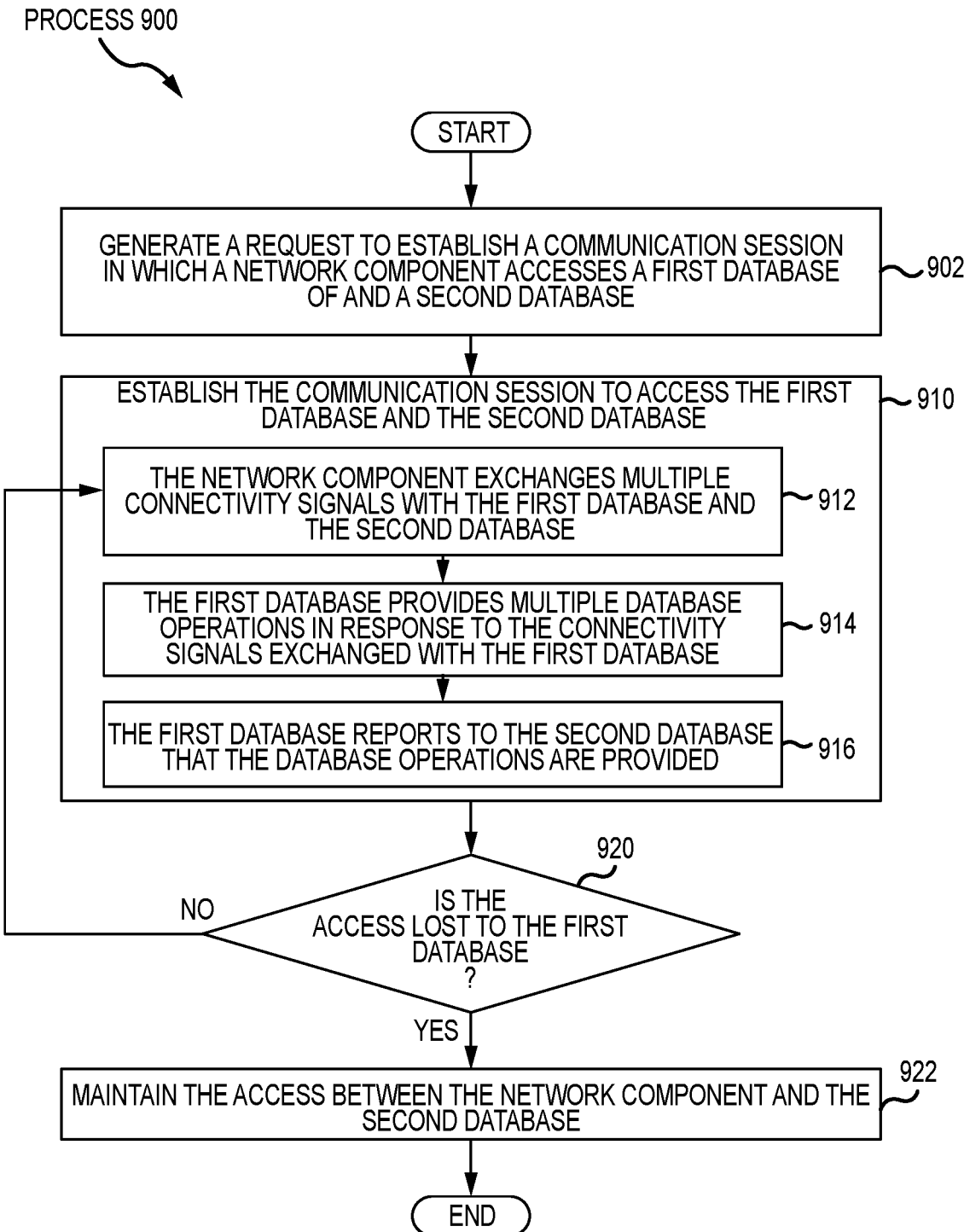
FIG. 9 illustrates an example flowchart of a method to reduce database interruptions in conjunction with the operational flow of FIG. 8.

FIG. 8 illustrates an operational flow 800 in which database interruptions 802 are reduced or prevented when a given database (e.g., primary database 116A) associated with a specific network component 101A performing the NRF (e.g., one of the primary NRFs 112) is unable to communicate with one or more network components (e.g., any of the network components 101A-101E) in the core network 106. FIG. 9 illustrates a third process 900 to perform one or more operations associated with the server 102 of FIG. 1.

Communication System Overview

FIG. 1 illustrates a diagram of a communication system 100 (e.g., a wireless communication system) comprises a server 102 configured to reduce network function interruptions, prevent network interruptions, reduce database interruptions, or prevent database interruptions in core network 106 comprising an SBA, in accordance with one or more embodiments. In the communication system 100 of FIG. 1, the server 102 may provision the core network 106 to respond to NRF (e.g., one of the primary NRFs 112) interruptions and database interruptions. In FIG. 1, the server 102 is communicatively coupled to multiple devices in the communication system 100. While FIG. 1 shows the server 102 connected directly to the one or more data networks 104, the server 102 may be located inside the core network 106 as part of one or more of the network components (e.g., any of the network components 101A-101E) in the core network 106.

In one or more embodiments, the communication system 100 comprises the user equipment 110A-110G (collectively referred as "user equipment 110"), the RAN 108, the core network 106, the one or more data networks 104, and the server 102. In come embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., Sub 6 GHZ). In this regard, the communication system 100 may comprise a large number of antennas. In some embodiments, the communication system may perform one or more communication operations associated with the 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Service-Based Architecture

As described above, the communication system 100 may comprise the SBA. The SBA may be an organization scheme in the core network 106 that comprises authentication, security, session management, and aggregation of traffic from end devices (e.g., the user equipment 110A-110G). In the SBA, the core network 106 may be representative of the 5G Core network and comprises multiple network components 101A-101E (collectively, the core network components 202 of FIG. 2). In the SBA, the network components 101A-101E are hardware (e.g., electronic circuitry with antennas or communication ports, a processor, and a memory) configured to perform one or more specific Network Functions (NFs). Herein, network components 101A-101E configured to perform one or more NFs maybe referenced using an NF-associated name. For example, a network component 101A configured to perform a Network Repository Function (NRF) may be referred to as an NRF (e.g., one of the primary NRFs 112) or a NRF network component. In another example, one of the network components 101A-101E may comprise a version of the server 102 with a server processor 122 configured to perform one or more specific NFs.

In some embodiments, individual network components 101A-101E provide services or resources to other network components 101A-101E performing different NFs. In other embodiments, each NF is a service provider that allocates one or more resources in communications inside or outside the network components 101A-101E to provide one or more services. The services may be specific for each of the network components 101A-101E and their respective NFs instead of each of the network components 101A-101E providing and consuming processing resources and memory resources to perform multiple NFs in the core network 106. In 5G NR mobile networks, the SBA is defined by 3GPP to comprise one or more network components 101A-101E configured to perform specific NFs to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide slices in accordance with specific application scenarios. A slice may be portions of a collection of NFs that are combined into providing specific application resources. The application resources may be provided to one or more user equipment 110A-110G simultaneously via the RAN 108 via web-based Application Programming Interfaces (APIs). The APIs may enable flexible and agile deployment of innovative services. An API may be a set of instructions that, when executed by a processor, perform modular or cloud-native functions and procedures allowing creation of applications that access features or data of an operating system, application, or other service in the communication system 100.

Communication System Components
Server

The server 102 is generally any device that is configured to process data, communicate with the data networks 104, one or more network components 101A-101E in the core network 106, the RAN 108, and the user equipment 110A-110G. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 120. The operations of the server processing engine 120 are described further below. In some embodiments, the server 102 comprises a server processor 122, one or more displays 124, one or more server Input (I)/Output (O) interfaces 126, a hardware accelerator 128, a server network interface 130, one or more administrator interfaces 132, and a server memory 134 communicatively coupled to one another. The server 102 may be configured as shown, or in any other configuration. As described above, the server 102 may be located in one of the network components 101A-101E located in the core network 106 and may be configured to perform one or more NFs associated with communication operations of the core network 106.

In one or more embodiments, the server processor 122, the one or more displays 124, the one or more server I/O interfaces 126, the hardware accelerator 128, the server network interface 130, the one or more administrator interfaces 132, and the server memory 134 may be located at a same location or distributed over multiple remote locations separate from one another.

The server processor 122 may comprise one or more processors operably coupled to and in signal communication with the one or more displays 124, the one or more server I/O interfaces 126, the hardware accelerator 128, the server network interface 130, the one or more administrator interfaces 132, and the server memory 134. The server processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 122 may be a programmable logic device, a microcontroller, a microprocessor, or any suitable combination of the preceding. The one or more processors in the server processor 122 are configured to process data and may be implemented in hardware or software executed by hardware. For example, the server processor 122 may be an 8-bit, a 16-bit, a 32-bit, a 64-bit, or any other suitable architecture. The server processor 122 may comprise an arithmetic logic unit (ALU) to perform arithmetic and logic operations, processor registers that supply operands to the ALU, and store the results of ALU operations, and a control unit that fetches software instructions such as server instructions 136 from the server memory 134 and executes the server instructions 136 by directing the coordinated operations of the ALU, registers and other components via the server processing engine 120. The server processor 122 may be configured to execute various instructions. For example, the server processor 122 may be configured to execute the server instructions 136 to perform functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

In the example of FIG. 1, the one or more displays 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays 124 may be configured to present visual information to one or more users (not shown). The one or more displays 124 may be configured to present visual information to the one or more users updated in real-time. The one or more displays 124 may be a wearable optical display (e.g., glasses or a head-mounted display (HMD)) configured to reflect projected images and enable user to see through the one or more displays 124. For example, the one or more displays 124 may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays 124 are a graphical display on the server 102. For example, the graphical display may be a tablet display or a smartphone display configured to display the data representations.

In one or more embodiments, the server I/O interfaces 126 may be hardware configured to perform one or more communication operations. The server I/O interfaces 126 may comprise one or more antennas as part of a transceiver, a receiver, or a transmitter for communicating using one or more wireless communication protocols or technologies. In some embodiments, the server I/O interfaces 126 may be configured to communicate using, for example, NR or LTE using at least some shared radio components. In other embodiments, the server I/O interfaces 126 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

In some embodiments, the hardware accelerator 128 may be any combination of a baseband processor, analog RF signal processing circuitry (e.g., including filters, mixers, oscillators, amplifiers, and the like), or digital processing circuitry (e.g., for digital modulation as well as other digital processing). For example, the hardware accelerator 128 may be configured to allocate power, frequency, and sensing resources during wireless communication operations.

The server network interface 130 may be any suitable hardware or software (e.g., executed by hardware) to facilitate any suitable type of communication in wireless or wired connections. These connections may comprise, but not be limited to, all or a portion of network connections coupled to additional network components 101A-101E in the core network 106, the RAN 108, the user equipment 110A-110G, the Internet, an Intranet, a private network, a public network, a peer-to-peer network, the public switched telephone network, a cellular network, a local area network (LAN), a metropolitan area network (MAN), a wide area network (WAN), and a satellite network. The server network interface 130 may be configured to support any suitable type of communication protocol.

The one or more administrator interfaces 132 may be user interfaces configured to provide access and control to of the server 102 to one or more users (not shown) or electronic devices. The one or more users may access the server memory 134 upon confirming one or more access credentials to demonstrate that access or control to the server 102 may be modified. In some embodiments, the one or more administrator interfaces 132 may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces 132 may enable access to one or more graphical user interfaces (GUIs) via an image generator display (e.g., the one or more displays 124), a touchscreen, a touchpad, multiple keys, multiple buttons, a mouse, or any other suitable type of hardware that allow users to view data or to provide inputs into the server 102. The server 102 may be configured to allow users to send requests to one or more network components 101A-101E or network.

The server memory 134 may be volatile or non-volatile and may comprise a read-only memory (ROM), random-access memory (RAM), ternary content-addressable memory (TCAM), dynamic random-access memory (DRAM), and static random-access memory (SRAM). The server memory 134 may be implemented using one or more disks, tape drives, solid-state drives, and/or the like. The server memory 134 is operable to store the server instructions 136, one or more configuration scripts 138, local provisioning parameters 140, configuration commands 142, a user-specific directory 144, and a provider-specific directory 146. In the server memory 134, the server instructions 136 may comprise commands and controls for operating one or more specific NFs in the core network 106 when executed by the server processing engine 120 of the server processor 122.

In one or more embodiments, the configuration commands 142 are configured to establish one or more initial communication sessions between two or more network components 101A-101E in the core network 106. Each configuration command of the configuration commands 142 may establish an initial communication session between a first network component of the network components 101A-101E comprising the server 102 and a second network component of the network components 101A-101E based at least in part upon a first configuration command of the configuration commands 142. The configuration commands 142 may be routing and configuration information (e.g., shown as routing and configuration information 314 in FIG. 3) for reinstating or reestablishing initial communication sessions when a change is detected in the operations of the core network 106. For example, in response to losing a specific initial communication session established with the first configuration command, the server 102 may attempt to reinstate the specific initial communication session based at least in part upon a second configuration command. The configuration commands 142 may be dynamically or periodically updated from another of the network components 101A-101E in the core network 106. Herein, initial communication sessions refer to communication signals exchanged between the server 102 and additional network components 101A-101E in the core network 106. In some embodiments, the configuration commands 142 are provided to the server 102 from another of the network components 101A-101E performing the NRF.

In one or more embodiments, the local provisioning parameters 140 are configured to establish one or more backup communication sessions between two or more network components 101A-101E in the core network 106. Each local provisioning parameter of the local provisioning parameters 140 may establish a backup communication session between a first network component of the network components 101A-101E comprising the server 102 and a second network component of the network components 101A-101E based at least in part upon a first local provisioning parameter of the local provisioning parameters 140. The local provisioning parameters 140 may be backup routing and configuration information for reinstating or reestablishing communication sessions when a access to the configuration commands 142 is lost or interrupted as it will be described in reference to FIGS. 4 and 5. For example, in response to losing a specific initial communication session established with the first configuration command and in response to failing an attempt to reinstate the specific initial communication session, the server 102 may transition to establish a backup communication session based at least in part upon a local provisioning parameter. The configuration commands 142 may be dynamically or periodically updated from the configuration commands 142. Herein, the configuration commands 142 are copied into the server memory 134 as the local provisioning parameters 140.

In one or more embodiments, the one or more configuration scripts 138 are configured to instruct one or more network components 101A-101E in the core network 106 to establish the one or more backup communication sessions based at least in part upon one or more of the local provisioning parameters 138. In some embodiments, the server processor 122 may implement the server processing engine 120 to execute a configuration script to instruct a specific network component of the network components 101A-101E to establish a backup communication session based at least in part upon a specific local provisioning parameter of the local provisioning parameters 140. The one or more configuration scripts 138 enable automation of the routing and configuration of network components 101A-101E in the core network 106. In this regard, the one or more configuration scripts 138 may reconfigure multiple cloud-NFs (CNFs) 150 that establish initial communication sessions with at least one NRF (e.g., one of the primary NRFs 112 or one of the secondary NRFs 114) in a communication path comprising one or more additional network components 101A-101E, such as those to be described in reference to the core network components 202 of FIG. 2. In other embodiments, the one or more configuration scripts 138 may be configured to reduce or remove discovery-based mechanisms to locate new target CNF to reestablish initial communication sessions once a connection with the NRF is lost. In this regard, the one or more configuration scripts 138 instruct routing and configuration of communication procedures based on static routing commands to restore restores services in the core network 106. Once the NRF is back online, the one or more configuration scripts 138 may be configured to transition connections in the core network 106 from relying on the local provisioning parameters 140 to the configuration commands 142 provided by the NRF.

The user-specific directory 144 may be configured to store user-specific information. The user-specific directory 144 may enable the server 102 to confirm user credentials to access one or more network components (e.g., one of the network components 101A-101E configured to perform the CNFs 150, a Session Management Function (SMF) 152, an access and management function (AMF) 154, one or more Service Communication Proxys (SCPs) 156, or the like) in the core network 106. The provider-specific directory 146 may be configured to store provider-specific information. The provider-specific directory 146 may enable the server 102 to validate credentials associated with a specific provider (e.g., one of the CNFs 150) against corresponding user-specific information in the user-specific directory 144.

User Equipment

In one or more embodiments, each of the user equipment (collectively, user equipment 110) (e.g., the user equipment 110A-110G) may be any computing device configured to communicate with other devices, such as the server 102, other network components 101A-101E in the core network 106, databases, and the like in the communication system 100. Each of the user equipment 110 may be configured to perform specific functions described herein and interact with one or more network components 101A-101E in the core network 106 via one or more base stations (collectively, base stations 111) (e.g., the base stations 111A-111G). Examples of user equipment 110 comprise, but are not limited to, a laptop, a computer, a smartphone, a tablet, a smart device, an IoT device, a simulated reality device, an augmented reality device, or any other suitable type of device.

In one or more embodiments, referring to the user equipment 110A as a non-limiting example of the user equipment 110, the user equipment 110A may comprise a user equipment (UE) network interface 160, a UE I/O interface 162, a UE processor 164, and a UE memory 166. The UE network interface 160 may be any suitable hardware or software (e.g., executed by hardware) to facilitate any suitable type of communication in wireless or wired connections. These connections may comprise, but not be limited to, all or a portion of network connections coupled to additional network components 101A-101E in the core network 106, the RAN 108, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 160 may be configured to support any suitable type of communication protocol.

The UE I/O interface 162 may be hardware configured to perform one or more communication operations. The UE I/O interface 162 may comprise one or more antennas as part of a transceiver, a receiver, or a transmitter for communicating using one or more wireless communication protocols or technologies. In some embodiments, the UE I/O interface 162 may be configured to communicate using, for example, 5G NR or LTE using at least some shared radio components. In other embodiments, the UE I/O interface 162 may be configured to communicate using single or shared RF bands. The RF bands may be coupled to a single antenna, or may be coupled to multiple antennas (e.g., for a MIMO configuration) to perform wireless communications. In some embodiments, the user equipment 110A may comprise capabilities for voice communication, mobile broadband services (e.g., video streaming, navigation, and the like), or other types of applications. In this regard, the UE I/O interface 162 of the user equipment 110A may communicate using machine-to-machine (M2M) communication, such as machine-type communication (MTC), or another type of M2M communication.

In some embodiments, the user equipment 110A is communicatively coupled to one or more of the base stations 111 via one or more communication links 190A-190G (e.g., collectively, communication link 190). The user equipment 110 may be a device with cellular communication capability such as a mobile phone, a hand-held device, a computer, a laptop, a tablet, a smart watch or other wearable device, or virtually any type of wireless device. In some applications, the user device 110 may be referred to as a UE, UE device, or terminal.

The UE processor 164 may comprise one or more processors operably coupled to and in signal communication with the UE network interface 160, the UE I/O interface 162, and the UE memory 166. The UE processor 164 is any electronic circuitry, including, but not limited to, state machines, one or more CPU chips, logic units, cores (e.g., a multi-core processor), FPGAs, ASICs, or DSPs. The UE processor 164 may be a programmable logic device, a microcontroller, a microprocessor, or any suitable combination of the preceding. The one or more processors in the UE processor 164 are configured to process data and may be implemented in hardware or software executed by hardware. For example, the UE processor 164 may be an 8-bit, a 16-bit, a 32-bit, a 64-bit, or any other suitable architecture. The UE processor 164 comprises an ALU to perform arithmetic and logic operations, processor registers that supply operands to the ALU, and store the results of ALU operations, and a control unit that fetches software instructions such as UE instructions 168 from the UE memory 166 and executes the UE instructions 168 by directing the coordinated operations of the ALU, registers, and other components via a UE processing engine 170. The UE processor 164 may be configured to execute various instructions. For example, the UE processor 164 may be configured to execute the UE instructions 168 to implement functions or perform operations disclosed herein, such as some or all of those described with respect to FIGS. 1-9. In some embodiments, the functions described herein are implemented using logic units, FPGAS, ASICs, DSPs, or any other suitable hardware or electronic circuitry.

Radio Access Network

In one or more embodiments, the RAN 108 enables the user equipment 110 to access one or more services in the core network 106. The one or more services may be a mobile telephone service, a Short Message Service (SMS) message service, a Multimedia Message Service (MMS) message service, an Internet access, cloud computing, or other types of data services. The RAN 108 may comprise the base stations 111 in signal communication with the user equipment 110 via the one or more communication links 190A-190G. Each of the base stations 111 may service the user equipment 110A-110G. In some embodiments, while multiple base stations 111 are shown connected to multiple user equipment 110 via the communication link 190, one or more additional base stations 111 may be connected to one or more additional user equipment 110 via one or more additional communication links 190. For example, the base stations 111A-111G may exchange connectivity signals with the user equipment 110A via the communication link 190A. In another example, the base station 111G may exchange connectivity signals with the user equipment 110G via the communication link 190G. In yet another example, the base stations 111 may service some user equipment 110 when the user equipment 110 are located within a geographic area serviced by one of the base In one or more embodiments, referring to the base station 111A as a non-limiting example of the base station 111, the base station 111A may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 106 and the user equipment 110. These connections may comprise, but not be limited to, all or a portion of network connections coupled to additional network components 101A-101E in the core network 106, other base stations 111, the user equipment 110, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 111A may allocate resources in accordance with one or more routing and configuration operations obtained from the core network 106. In some embodiments, resources may be allocated to enable capabilities in the user equipment 110 for voice communication, mobile broadband services (e.g., video streaming, navigation, and the like), or other types of applications.

In some embodiments, the base station 111A is communicatively coupled to one or more of the user equipment 110 via the one or more communication links 190. In some applications, the base station 111 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

Core Network

The core network 106 may be a network configured to manage communication sessions for the user equipment 110. In one or more embodiments, the core network 106 may establish connections between user equipment 110 and a particular data network 104 in accordance with one or more communication protocols. In the example of FIG. 1, the core network 106 comprises one or more primary NRFs 112, one or more secondary NRFs 114, one or more primary databases 116, one or more secondary databases 118, one or more CNFs 150, the SMF 152, the AMF 154, and one or more SCPs 156. Herein, while multiple NRFs are shown, the core network 106 may comprise a single network component 101A performing the NRF as shown in FIG. 1. Further, while multiple databases are shown, the core network 106 may comprise a single database in a single network component 101B as shown in FIG. 1.

In some embodiments, any one of the network components 101A-101E performing the one or more primary NRFs 112 or the one or more secondary NRFs 114 (collectively, NRF 112/114) may be configured to register any services offered by the core network 106. The NRF 112/114 may comprise a service registration procedure that accesses the one or more primary databases 116 and the one or more secondary databases 118 (collectively, databases 116/118) to store or retrieve routing and configuration information associated with one or more network components 101A-101E in the core network 106. The NRF 112/114 may access the database to discover services offered by other networks or other network components 101A-101E with service discovery procedures and service authorization procedures. The NRF 112/114 may maintain a list of available NFs operations available in the core network 106 and any network components 101A-101E associated with performing a given NF. The NRF 112/114 may also performs registration and discovery of service such that different NFs may find each other via APIs. As an example, when the SMF 152 is registered to the NRF 112/114, the SMF 152 is discoverable by the AMF 154 when the user equipment 110 attempts to access a given service type via the SMF 152. In other embodiments, the NFs may be connected via a communication bus 210 (shown in FIG. 2) to all other additional network elements in the core network 106. In the SBA, the NRF may enable access between user equipment 110 and the services offered via the NFs.

In one or more embodiments, the network components 101C performing the one or more CNFs 150 may be configured to operate multiple services associated with one or more applications, while dynamically directing network traffic within the core network 106. In some embodiments, the network component 101E performing the SMF 152 may be configured to manage one or more communication sessions established between network components 101A-101E of the core network 106, allocate and manage resource allocation routing for the user equipment 110, user plane selection, QoS and configuration enforcements for the control plane, service registration, discovery, establishment, and the like. In other embodiments, the network component 101C performing the AMF 154 may be configured to manage mobility, registration, connections, and overall access for the other network components 101A-101E in the core network 106. The AMF 154 may act as an entry point for connections between the user equipment 110 and a given service. In yet other embodiments, the network component 101E performing the one or more SCPs 156 may be configured to provide a point of entry for a cluster of NFs in the core network 106 to the user equipment 110 once the user equipment 110 are discovered by the NRF 112/114. This allows the SCPs 156 to be delegated discovery points in the core network 106.

In some embodiments, the core network 106 enables the user equipment to communicate with the server 104, or another type of device, located in a particular data network 104 or in signal communication with a particular data network 104. The core network 106 may implement a communication method that does not require the establishment of a specific communication protocol connection between the user equipment 110 and one or more of the data networks 104. The core network 106 may include one or more types of network devices (not shown), which may perform different NFs.

In some embodiments, the core network 106 may include a 5G NR or an LTE access network (e.g., an evolved packet core (EPC) network) among others. In this regards, the core network 106 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QoS) class, type of service, or particular user associated with one or more of the user equipment 110. For example, a logical network may be a Mobile Private Network (MPN) configured for a particular organization. In this example, when the user equipment 110A is configured and activated by a wireless network associated with the RAN 108, the user equipment 110A may be configured to connect to one or more particular network slices (i.e., logical networks) in the core network 106. Any logical networks or slices that may be configured for the user equipment 110A may be configured using a network component (e.g., one of the network components 101A-101E of FIG. 1 or the core network components 202 of FIG. 2) performing a Network Slice Selection Function (NSSF) 204 (as shown in FIG. 2) that may store a subscription profile associated with the user equipment 110A, in a network component operating as a Unified Data Management (UDM) 206 (as shown in FIG. 2). Further, when the user equipment 110A may request a connection to a particular logical network or slice, the user equipment 110A may send a request to the network component performing the AMF 154. The AMF 154 may provide a list of allowed logical networks or slices to the user equipment 110A. The user equipment 110A may then request a Packet Data Unit (PDU) connection with one or more of the provided logical networks or slices.

Data Networks

In the example system 100 of FIG. 1, the data networks 104 may facilitate communication within the communication system 100. This disclosure contemplates that the data networks 104 may be any suitable network operable to facilitate communication between the server 102, the core network 106, the RAN 108, and the user devices 110. The data networks 104 may include any interconnecting system capable of transmitting audio, video, signals, data, messages, or any combination of the preceding. The data networks 104 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Core Network Communication Operations

FIG. 2 illustrates one or more core network communication operations 200 in accordance with one or more embodiments. The core network communication operations 200 may be performed by one or more core network components 202 performing dedicated NFs in the core network 106. In the non-limiting example of FIG. 2, the core network components 202 are shown solely with the labels of one or more NFs performed for ease of reference. As described above, the NFs may be performed by one of the core network components 202 such as those network components 101A-101E described in reference to FIG. 1. The core network components 202 may comprise the NRF 112/114, the database 116/118, the one or more CNFs 150, the AMF 154, the SMF 152, the one or more SCPs 156, the NSSF 204, and the UDM 206 described or mentioned in reference to the core network 106 of FIG. 1. Further, the core network components 202 may comprise network components (e.g., similar to those network components 101A-101E of FIG. 1) configured to perform a Network Exposure Function (NEF) 220, a User Plane Function (UPF) 222, an Authentication Server Function (AUSF) 224, a Policy Control Function (PCF) 226, a Unified Data Repository (UDR) 228, and an Equipment Identity Register (EIR) 230. In some embodiments, the multiple network components performing the different NFs of the core network components 202 may be interconnected to one another and additional SBA APIs 240 via the communication bus 210. The interconnections, operations, and procedures performed by the core network components 202 may follow the guidelines (such as reference information elements to establish communication among the network components) for the SBA described in TS 23.501, TS 29.510, and TS 29.511 of the 3GPP standard.

In one or more embodiments, instead of a single NRF 112/114, the core network 106 comprises multiple primary NRFs 112 and multiple secondary NRFs 114. The multiple primary NRFs 112 may be one or more of the core network components 202 configured to establish initial communication sessions between any other of the core network components 202 of the core network 106. The multiple secondary NRFs 114 may referred to the core network components 202 configured to establish backup communication sessions between the core network components 202 in the communication system 100 when initial communication sessions established via a corresponding primary NRF 112 are lost. In particular, the core network components 202 of FIG. 2 show a primary NRF 112A and a corresponding secondary NRF 114A, a primary NRF 112B and a corresponding secondary NRF 114B, and a primary NRF 112C and a corresponding secondary NRF 114C. In some embodiments, each of the core network components 202 performing one of the NRFs 112/114 may comprise a version of the server 102 of FIG. 1. In other embodiments, one or more servers operating as the server 102 may be configured to perform one or more of the NRFs 112/114.

In one or more embodiments, the primary NRF 112A, the primary NRF 112B, and the primary NRF 112C may be communicatively coupled to one another to provide feedback regarding each other's NRF operations. In some embodiments, the secondary NRF 114A, the secondary NRF 114B, and the secondary NRF 114C may be communicatively coupled to one another to provide feedback regarding each other's NRF operations. In other embodiments, the primary database 116A, the primary database 116B, and the primary database 116C may be communicatively coupled to one another to provide feedback regarding each other's database operations. In yet other embodiments, the secondary database 118A, the secondary database 118B, and the secondary database 118C may be communicatively coupled to one another to provide feedback regarding each other's database operations.

In one or more embodiments, instead of a single database 116/118, the core network 106 comprises multiple primary databases 116 and multiple secondary databases 118. The multiple primary databases 116 may refer to one of the network components 101A-101E configured to enable initial access between any other network components 101A-101E of the core network 106 and the database associated with a given NRF of the NRFs 112/114 of FIG. 1. The multiple secondary databases 118 may refer to the network components 101A-101E configured to enable backup access between any network components 101A-101E in the communication system 100 and the database associated with a given NRF of the NRFs 112/114 of FIG. 1 when the initial access to a corresponding database 116 is lost. In particular, the core network components 202 of FIG. 2 show a primary database 116A and a corresponding secondary database 118A, a primary database 116B and a corresponding secondary database 118B, and a primary database 116C and a corresponding secondary database 118C. In some embodiments, each of the core network components 202 enabling access to one of the databases 116/118 may comprise a version of the server 102 of FIG. 1. In other embodiments, one or more servers operating as the server 102 may be configured to enable access to one or more of the databases 116/118.

In one or more embodiments, a given base station 111X and the server 102 may be connected to the core network components 202 via a connection 250 and a connection 260, respectively. The base station 111X may be configured to enable any one of the user equipment 110 of FIG. 1 to access the core network components 202 in the core network 106 using one or more RATs and one or more communication protocols. In some embodiments, the core network components 202 may include additional NFs (not shown) that may be part of the SBA, such as a Unified Data Management (UDM), a Charging Function (CHF), a Network Data Analytics Function (NWDAF), an Application Function (AF), and a Short Message Service Function (SMSF) among others.

In one or more embodiments, similar to the one or more CNFs 150, the one or more SCPs 156, the NRFs 112/114, and the databases 116/118, while FIG. 2 shows a single AMF 154, SMF 152, NSSF 204, UDM 206, NEF 220, UPF 222, the AUSF 224, PCF 226, UDR 228, and EIR 230 for illustration purposes, the core network 106 may comprise multiple AMFs 154, SMFs 152, NSSFs 204, UDMs 206, NEFs 220, UPFs 222, AUSFs 224, PCFs 226, UDRs 228, and EIRs 230. In some embodiments, the NFs shown in the core network components 202 may be performed in a dedicated network component (e.g., in the server 102 located in one of the network components 101A-101E in FIG. 1 or communicatively connected with the core network components 202 of FIG. 2) or a simulated NF implemented on a common shared physical infrastructure across multiple network elements. For example, the server 102 may be configured to implement one or more of the NFs of FIG. 2 in collaboration with other of the core network components 202 using a Virtual Network Function (VNF) virtual machine, a CNF container, an event driven serverless architecture interface, or a specific type of SDN architecture.

In one or more embodiments, the NRFs 112/114, the databases 116/118, the one or more CNFs 150, the SMF 152, the AMF 154, and the one or more SCPs 156 may comprise the operations described in FIG. 1. The NSSF 204, the UDM 206, the NEF 220, the UPF 222, the AUSF 224, the PCF 226, the UDR 228, and the EIR 230 may perform one or more of the operations described below.

The NSSF 204 may be implemented in one of the core network components 202 configured to maintain a list of authorization operations in the core network 106. As an example, in an event in which the AMF 154 authorizes uses of network slices and applications based at least in part upon subscription information stored in the UDM 206 or queries the NSSF 204 to authorize access to a network slice or application based at least in part upon one or more service requirements. The NSSF 204 may redirect traffic to a specific one of the core network components 202 performing an intended network slice or application.

The UDM 206 may be implemented in one of the core network components 202 configured to perform management data of functions or services. In some embodiments, the UDM 206 is configured to perform operations such as handling of user identification, management of subscriptions, authentication of users, authorization to access network components to perform operations (e.g., such as roaming, and the like). In some embodiments, the UDM 206 and the AUSF 224 may share performing of some of the aforementioned operations. In this regard, the AUSF 224 may be for authentication processes while the UDM 206 may manage user data for any other processes in the core network 106. In other embodiments, the UDM 206 may receive requests for subscriber data from the SMF 152, the AMF 154, the AUSF 224, and the SMSF before providing any services. The AUSF 224 may be implemented in one of the core network components 202 configured to enable the AMF 154 to authenticate the user equipment 110.

The NEF 220 may be implemented in one of the core network components 202 configured to provide services and resources over APIs within and outside the core network 106. In one or more embodiments, one or more 5G services may be provided via the NEF 220 based at least in part upon API identifiers or indicators. In some embodiments, the NEF 220 may enable third-party (e.g., outside the core network 106 or unrelated to a network component performing a specific NF or providing a specific service).

The UPF 222 may be implemented in one of the core network components 202 configured to connect data coming over the RAN 108 to the data networks 104. In some embodiments, the UPF 222 may be able to route data packets to correct destinations on the data networks 104.

The PCF 226 may be implemented in one of the core network components 202 configured to provide a policy control framework in which rules and policies are implemented in accordance with one or more application guidelines. In some embodiments, the PCF 226 may apply policy decisions to services provided, accessing subscription information, and the like. to control behavior associated with the core network 106.

The UDR 228 may be implemented in one of the core network components 202 configured to operate as a centralized data repository for subscription data, subscriber policy data, session information, context information, and application states. In some embodiments, the UDR 228 may be configured to provide API integrations with other NFs (e.g., the one or more core network components 202) to retrieve subscriber subscription and policy data. The UDR 228 may notify other NFs of changes in subscriber data, supports real-time or batch (e.g., bulk) data access provisioning and subscriber data provisioning, and manages service parameters and application data for advanced applications.

The EIR 230 may be implemented in one of the core network components 202 configured to determine whether a given user equipment 110 is allowed onto the core network 106. In some embodiments, when a subscriber (e.g., user 180 via the user equipment 110G) connects to the core network 106, the EIR 230 may be configured to obtain user data or user profiles may be provided to the core network 106 to confirm service information and availability to the user 180.

In one or more embodiments, the server 102 may be located in the network component 101C configured to perform the AMF 154. The server 102 may be configured to provide reliable solutions to reduce and to prevent NRF interruptions when the network component 101A performing the NRFs 112/114 is unable to communicate with the rest of the core network 106. To reduce periods of downtime for at least a portion of the core network 106, the server 102 may execute one of the configuration scripts 138 to provide backup routing and configuration information to network components (e.g., one of the network components 101A-101E as shown in FIG. 1 or communicatively connected with the core network components 202 as shown in FIG. 2) in the core network 106. In some embodiments, to reduce or eliminate periods of downtime for at least a portion of the core network 106, the server 102 may replace session operations performed by one of the primary NRFs 112 with session operations performed by one of the secondary NRFs 114.

In other embodiments, the server 102 may be configured to provide reliable solutions to reduce and to prevent database interruptions when a specific network component of the core network components 202 providing access to the databases 116/118 is unable to communicate with the rest of the core network 106. To reduce periods of downtime for at least a portion of the core network 106, the server 102 may execute one of the configuration scripts 138 to provide backup routing and configuration information to other of the core network components 202 in the core network 106. In some embodiments, to reduce or eliminate periods of downtime for at least a portion of the core network 106, the server 102 may replace database operations performed by one of the primary databases 116 with database operations performed by one of the secondary databases 118.

Communication Structure

FIG. 3 illustrates a communication structure 300 in accordance with one or more embodiments. The communication structure 300 comprises connections from the server 102 to multiple electronic components located in multiple communication regions 302A-302C (collectively, communication region 302) via a communication connection 320 and via a communication connection 330. The communication structure 300 may comprise the one or more core network components 202 and the one or more availability zones (collectively, availability zones 340). Each of the availability zones 340 may comprise one or more of the user equipment 110. In FIG. 3, the communication structure 300 shows an operation flow in which routing and configuration information 314 is provided from the server 102 to the one or more user equipment 110. Each communication region 302 is shown to comprise a couple of availability zones. For example, a communication region 302A comprises an availability zone 340A and an availability zone 340B; a communication region 302B comprises an availability zone 340C and an availability zone 340D; and a communication region 302C comprises an availability zone 340E and an availability zone 340F. Each of the availability zone 340 may comprise multiple base stations 111 and user equipment 110.

In one or more embodiments, each of the primary NRFs 112, each of the secondary NRFs 114, each of the primary database 116, and each of the secondary database 118 may be configured to be performed in association with a specific communication region 302 or a specific availability zone 340. For example, the primary NRF 112A, the secondary NRF 112A, the primary database 116A, and the secondary database 118A may be configured to be performed in association with the communication region 302A and the availability zone 340A or the availability zone 340B. In another example, the primary NRF 112B, the secondary NRF 112B, the primary database 116B, and the secondary database 118B may be configured to be performed in association with the communication region 302B and the availability zone 340C or the availability zone 340D. In yet another example, the primary NRF 112C, the secondary NRF 112C, the primary database 116C, and the secondary database 118C may be configured to be performed in association with the communication region 302C and the availability zone 340E or the availability zone 340F.

In one or more embodiments, the server 102 and the core network components 202 may be located in the core network 106 while the communication regions 302 may include a combination of the RAN 108 and the user equipment 110. In some embodiments, the server 102 may execute one or more configuration scripts 138 while provisioning routing and configuration information 314 changes to all network components. In some embodiments, the server 102 may be a jump server configured to provide a master network data map 312 on the core network components 202 via the communication connection 320. The server 102 may be configured to instruct one or more of the core network components 202 in the core network 106 to establish one or more initial communication sessions in accordance with one or more configuration commands 142. Further, the server 102 may be configured to instruct one or more core network components 202 in the core network 106 to establish one or more backup communication sessions in accordance with one or more local provisioning parameters 140. In some embodiments, the server 102 is configured to establish a backup communication session between any two specific network components when an initial connection is determined to be lost between the two specific network components.

In the core network 106, the server 102 may execute one of the configuration scripts 138 as part of a process to reduce NRF interruptions. In particular, the server 102 may be configured to determine that a specific initial communication session is lost and, upon determining that the specific initial communication session is lost, the server 102 may execute one of the configuration scripts 138 to instruct reestablishment of connections via a specific backup communication session. In the example of FIG. 3, the server 102 may provide a backup of the master network data map 312 to the core network components 202 via the communication connection 320. In turn, the core network components 202 may provide static routing and configuration information 314 to any electronic components or devices (e.g., the base stations 111 and the user equipment 110) until the NRF interruption is resolved. In this regard, the routing and configuration information 314 provided to the availability zones 340 in the communication regions 302 may comprise static configuration, static connections, and one or more connectivity checks.

In some embodiments, the communication connection 320 may be any wired or wireless communication connections between the server 102 and other additional network components of the core network components 202 in the core network 106. Further, the communication connection 330 may be any wired or wireless communication connections between the core network 106, the RAN 108, the one or more base stations 111 and the one or more user equipment 110 distributed within the multiple availability zones 340.

Operational Flow to Reduce Network Repository Function Interruptions

FIG. 4 illustrates an operation flow 400 performed to reduce NRF interruptions in the SBA, in accordance with one or more embodiments. As a non-limiting example, the operation flow 400 is performed via the server 102 operating as part of the network element 101E performing the AMF 154 and in communicatively coupling with at least one of the user equipment 110A, at least one network component performing one or more NRFs 112/114 (e.g., the network component 101A), and at least one network component performing the SMF 152 (e.g., the network component 101E). In some embodiments, the operation flow 400 comprises reducing NRF interruptions by establishing backup communication sessions in the event that corresponding initial communication sessions are lost. In some embodiments, the NRF interruptions are events in which the NRF 112/114 cannot be performed in relation to the core network 106.

Establish Initial Communication Session

In one or more embodiments, the operation flow 400 starts when the user equipment 110A transmits a request to establish an initial communication session (e.g., shown as the initial session request 402). At this stage, the server 102 in the AMF 154 may be configured to request routing and configuration information from the NRFs 112/114 to route and configure access to one or more services in the core network 106 for the user equipment 110A. Concurrently, the SMF 152 may exchange connectivity signals with the NRFs 112/114 providing connection registration data via a connection registration 404. In this process, the NRFs may establish session requests 406 in which one or more of the configuration commands 142 are generated and saved in the server memory 134. At this stage, a backup copy of the configuration commands 142 is generated and stored in the server memory 134 as the local provisioning parameters 140. A registration entry is created in a registration creation 408 and transmitted to the SMF 152 such that the SMF 152 may provide resources and routing for one of the user equipment 110.

Concurrently with receiving the initial session request 402, the AMF 154 may transmit a connection discovery 410 to the NRFs 112/114 to request to access services or resources in the core network 106. The NRFs 112/114 may perform a service discovery 412 in which the NRFs 112/114 evaluate user profiles or user credentials from the user equipment 110A against the user-specific directory 144 and service profile or resources from the core network 106 against the provider-specific directory 146. In response to verifying and associating information from the user equipment 110A and the NRFs 112/114, the NRFs 112/114 provide multiple SMF lists 414 to the AMF 154. The SMF lists 414 enable the user equipment 110A to establish the initial communication session. The AMF 154 may transmit may respond by creating a PDU session 420 to access resources in the core network 106 and one or more data networks 104. As the PDU session 420 is created, the registration access 422 provides information regarding resource allocation commands to service the user equipment 110A. At this stage, the user equipment 110A, the AMF 154, the NRFs 112/114, and the SMF 152 are considered to have established an initial session 424 and the SMF 152 is allowed to provide a registration access 424 to the AMF 154. During the initial communication session 420, the NRFs 112/114 may be configured to perform the NRF and dynamically update the configuration commands 142 at the server 102. Further, the local provisioning parameters may be updated dynamically any time one of the configuration commands 142 is updated or modified. In some embodiments, the local provisioning parameters 140 may be updated periodically after a predefined time period.

Loss of Initial Communication Session

In one or more embodiments, the initial communication session 420 to the NRFs 112/114 may be lost due to an NRF interruption 430. The NRF interruption 430 may be caused by a disconnection of the NRFs 112/114 from the core network 106. In this regard, the network element 101A performing the NRF 112/114 may be unable to connect to the communication bus 210 in the core network 106. In some embodiments, the NRF interruption 430 may comprise that the network component 101A is disconnected from the SBA or that the network component 101A is unable to continue performing the NRFs 112/114. To identify or confirm that the NRF interruption 430 occurred in the core network 106, the server 102 may be configured to identify or confirm that certain connectivity signals are not received from the network component 101A. The certain connectivity signals may comprise periodic connection feedback received from the NRFs 112/114 or expected periodic signaling (e.g., to update the configuration commands 142).

If the certain connectivity signals are not received from the NRFs 112/114, then the server 102 may be configured to perform one or more reestablishment attempts 450 in which the AMF 154 and one or more additional core network components 202 request one or more connectivity signals from the NRFs 112/114 to check for a connection. If a response is not received and the reestablishments attempts 450 fail as a result, the server 102 may be configured to determine or confirm that the NRF interruption 430 occurred. Upon identifying or confirming that the NRF interruption 430 occurred in the network, the server 102 may be configured to execute one of the configuration scripts 138 that automatically establishes backup communication sessions where initial communication sessions are lost 440. In some embodiments, the configuration script 138 may be configured to instruct the SMF 152 and any other core network components 202 to transition to the local provisioning parameters 140 instead of the configuration commands 142. The server 102 may then establish one or more backup communication sessions to restore operations in the core network 106 by statically providing routing and configuration information that would otherwise be provided by the NRFs.

In one or more embodiments, to transition from the configuration commands 142 to the local provisioning parameters 140, the AMF selects subsequent or ongoing SMF lists 414 for the backup communication sessions by modifying multiple information elements as part of the operations of the core network 106. The configuration script 138 may be configured to automatically replace information elements from relying on the NRFs 112/114 to relying on locally provisioned parameters. As a non-limiting example, the information elements that select one or more routing or configuration information for services associated with the SMF 152, the UDM 206, the AUSF 224, the PCF 226, the SMSF (not shown), and the EIR 230. The information parameters may be modified from an NRF setting command to a LocalProvisioning setting command or a NRFLocalProvisioning setting command. These information parameters may comprise smfSelection, udmSelection, ausfSelection, pcfSelection, smsfSelection, and eirSelection to change the respective settings for the SMF 152, the UDM 206, the AUSF 224, the PCF 226, the SMSF (not shown), and the EIR 230. In some embodiments, the LocalProvisioning setting command causes the AMF 152 to use locally provisioned NFs for the selection of any given NF. In other embodiments, the NRFLocalProvisioning setting command causes the AMF 152 to check any locally provisioned selection rules before relying on the NRFs 112/114. If there is a match, then the AMF 152 selects the NF matching the rule. If there is no match, then the AMF 152 selects the NRFs 112/114.

Transition to Backup Communication Session

In one or more embodiments, the server 102 transitions to a static implementation of the NRFs 112/114 by using the local provisioning parameters 140. In this regard, the server 102 may be configured to transition to the local provisioning and backup communication sessions 460. The backup communication sessions may be established using the local provisioning parameters 140 that are backup copies of configuration commands 142 used to establish the initial communication sessions 420. In some embodiments, the server 102 may periodically check for the return of the NRFs 112/114. The server 102 may reestablish the communication session 420 upon determining that the network component 101A performing the NRFs 112/114 is reconnected to the core network 106.

Example Process to Reduce Network Repository Function Interruptions

FIG. 5 illustrates an example flowchart of a process 500 to reduce NRF interruptions (e.g., the NRF interruption 430) in the SBA, in accordance with one or more embodiments. In one or more embodiments, the process 500 comprises reducing NRF interruptions by establishing backup communication sessions in the event that an initial communication session is lost. In some embodiments, the NRF interruptions are events in which the NRF 112/114 cannot be performed in relation to the core network 106.

The process 500 starts at operation 502, where the server 102 receives a request for establishing a communication session between a first network component and a second network component. The first network component may be the network component 101C performing the AMF 154. The second component may be the network component 101E performing the SMF. In this regard, the network component 101C may include the server 102 that attempts to establish a communication session between the AMF 154 and the SMF 152. The process 500 continues at operation 504, where the server 102 establishes an initial communication session between the first network component and the second network component based at least in part upon a configuration command. As described in reference to FIG. 4, the initial communication session is established to obtain routing or configuration information using one or more of the configuration commands 142 previously obtained from a third network component (e.g., the network component 101A performing the NRFs 112/114. At operation 506, the server 102 may exchange multiple connectivity signals between the first network and the second network. The connectivity signals may be performed over predetermined time periods such that the AMF 154 and the SMF 152 may determine when a correspondence connectivity signal is not received at either network component within a given time period.

At operation 510, the server 102 may determine whether the initial communication session is lost. As described in reference to FIG. 4, the network component 101C may determine that a specific connectivity signal is not received from the network component 101E in a predetermined time period. The AMF 154 may determine that the initial communication connection is lost if a reestablishment procedure fails in which the AMF 154 attempts to reconnect the initial communication session with the SMF 152. If the initial communication session is not lost (i.e., NO), the process 500 returns to operation 506. In this case, at operation 510, the AMF 154 may receive the specific connectivity signal within the predetermined time period. In response, the AMF 154 may confirm that the NRF 112/114 is connected to the core network 106 or that the initial communication is not lost. If the initial communication session is lost (i.e., YES), the process 500 proceeds to operation 512. In this case, at operation 510, the AMF 154 may not receive the specific connectivity signal within the predetermined time period. In response, the AMF 154 may confirm, assume, or determine that the NRF 112/114 is not connected to the core network 106 or that the initial communication is lost.

The process 500 ends at operation 512, where the server 102 executes a configuration script instructing the first network component to establish a backup communication session based at least in part upon a local provisioning parameter. The configuration script may be one of the configuration scripts 138 instructing to reconnect the network component 101C and the network component 101E. The configuration script may instruct the network component 101C to establish a reconnection by establishing the backup communication session using one or more local provisioning parameters 140 instead of the configuration commands 142.

Operational Flow to Reduce Network Repository Function Interruptions

FIG. 6 illustrates an operation flow 600 performed to reduce, to prevent, or to eliminate NRF interruptions in the SBA, in accordance with one or more embodiments. As a non-limiting example, the operation flow 600 is performed via the server 102 operating as part of the network element 101C performing the AMF 154 and in communicatively coupling with at least one of the core network components 202 performing one or more of the CNFs 150 and the one or more SCPs 156, at least one network component performing the primary NRF 112A (e.g., the network component 101A), at least one network component performing the secondary NRF 114A (e.g., the network component 101A), at least one network component performing one or more additional primary NRFs 602 (e.g., the primary NRF 112B and the primary NRF 112C), and at least one network component performing one or more additional secondary NRFs 604 (e.g., the secondary NRF 114B and the secondary NRF 114C). In some embodiments, the operation flow 600 comprises reducing, preventing, or eliminating NRF interruptions by maintaining communication sessions with the secondary NRF 114A when in the event that the primary NRF 112A is lost due to an NRF interruption. In some embodiments, the NRF interruptions are events in which any one of the NRF 112/114 cannot be performed in relation to the core network 106.

In some embodiments, while the primary NRF 112A is used as a reference for the operation flow 600, the primary NRF 112B or the NRF 112C may perform any of the operations described in reference to the primary NRF 112A. In other embodiments, while the secondary NRF 114A is used as a reference for the operation flow 600, the secondary NRF 114B or the secondary NRF 114C may perform any of the operations described in reference to the secondary NRF 114A.

Establish Communication Session with a Primary NRF and a Secondary NRF

In one or more embodiments, the operation flow 600 starts when the network component 101D performing one of the CNFs 150 communicates with the network component 101E performing the SCP 156 and the network component 101C performing the AMF 154 to access the primary NRF 112A and the secondary NRF 114A performed by the network component 101A. The CNFs 150 may establish a communication session (e.g., shown as session establishment 610) with both the primary NRF 112A and the secondary NRF 114A. In this communication session, the AMF 154 may receive SMF lists and other correspondence from the primary NRF 112A while maintaining an active (e.g., open) communication link with both the primary NRF 112A and the secondary NRF 114A. In the communication link, the AMF 154 may perform one or more session operations 612 with the primary NRF 112A where the primary NRF 112A establishes routing and configuration information for NFs in the core network 106 and any user equipment 110 attempting to access services from the core network 106. At this stage, the server 102 in the AMF 154 may be configured to request routing and configuration information from the primary NRFs 112A to route and configure access to one or more services in the core network 106. Concurrently, the SMF 152 may exchange connectivity signals with the primary NRF 112A providing connection registration data via a connection registration and eventually establish a PDU with one or more of the data networks 104. The routing and configuration commands from the primary NRF 112A may be saved as the configuration commands 142 in the server 102. During the communication session, the primary NRF 112A may be configured to perform the NRF and dynamically update the configuration commands 142 at the server 102.

In one or more embodiments, the primary NRF 112A may provide the secondary NRF 114A with a report in which the session operations 612 are copied. The report may be a string of data, a sequence of data packets, or a confirmation signal acknowledging that a service is provided to the rest of the core network 106. The server 102 may assume that all session operations 612 performed with the primary NRF 112A are reported to the secondary NRF 114A. In some embodiments, the primary NRF 112A and the secondary NRF 114A may not be performed by the same network component 101A. In some embodiments, the session operations 614 are further reported as copied operations 616 between the primary NRF 112A and the additional primary NRFs 602. In other embodiments, the session operations 614 are further reported as copied operations 618 between the secondary NRF 114A and the additional secondary NRFs 604. Similar to the report of operations 614, the copied operations 616-618 may be data strings, sequences of data packets, or signal confirmations acknowledging that one or more services are provided to the rest of the core network 106.

Loss of Communication Session with the Primary NRF

In one or more embodiments, the communication session to the primary NRF 112A may be lost due to an NRF interruption 620. Similar to the NRF interruption 430, the NRF interruption 620 may be caused by a disconnection of the primary NRF 112A from the core network 106. In this regard, the network element 101A performing the primary NRF 112A may be unable to connect to the communication bus 210 in the core network 106. In some embodiments, the NRF interruption 620 may comprise that the network component 101A is disconnected from the SBA or that the network component 101A is unable to continue performing the primary NRF 112A causing a session to be lost (e.g., session lost 630). To identify or confirm that the NRF interruption 620 occurred in the core network 106, the server 102 may be configured to identify or confirm that certain connectivity signals are not received from the network component 101A. The certain connectivity signals may comprise periodic connection feedback received from the primary NRF 112A or expected periodic signaling (e.g., to update the configuration commands 142).

If the certain connectivity signals are not received from the primary NRF 112A, then the server 102 may be configured to perform one or more reestablishment attempts in which the AMF 154 and one or more additional core network components 202 request one or more connectivity signals from the primary NRF 112A to check for a connection. If a response is not received and there are failed reestablishments 640 as a result, the server 102 may be configured to determine or confirm that the NRF interruption 620 occurred. Concurrently, and similar to the failed reestablishments 640, the secondary NRF 114A may identify that the primary NRF 112A has undergone the interruption 620 if the report operations 614 are not received and one or more reported operations are missing (e.g., one or more missing reported operations 650).

Maintain Communication Session with the Secondary NRF

In one or more embodiments, upon identifying that the primary NRF 112A is disconnected or irresponsive due to the NRF interruption 620, the server 102 may be configured to maintain a communication session with the secondary network component even if the communication session with the primary NRF 112A is lost. At this stage, the core network 106 relies on the secondary NRF 114A until a connection with the primary NRF 112A is restored. The secondary NRF 114A may perform one or more session operations 660 with the core network 106. After the session operations 660 are performed, the secondary NRF 114A may transmit a copy of the session operations to the additional primary NRFs 602 (e.g., copy operations 662) and the additional secondary NRFs 604 (e.g., copy operations 664).

Example Process to Reduce Network Function Interruptions

FIG. 7 illustrates an example flowchart of a process 700 to reduce, to prevent, or to eliminate NRF interruptions (e.g., the NRF interruption 620 of FIG. 6) in the SBA, in accordance with one or more embodiments. In one or more embodiments, the process 700 comprises reducing, preventing, or eliminating NRF interruptions by controlling backup network components (e.g., the network component 101A performing the secondary NRFs 114) to establish or maintain secondary communication sessions in the event that a corresponding primary communication session is lost. In some embodiments, the NRF interruptions are events in which the primary NRFs 112 cannot be performed in association with the core network 106.

The process 700 starts at operation 702, where the server 102 generates a request to establish a communication session between a first network component, a second network component, and a third network component. The first network component may be the network component 101C performing the AMF 154. The second network component may be the network component 101A performing the primary NRFs 112. The third network component may be the network component 101A performing the secondary NRFs 114. In some embodiments, two or more different network components of the core network components 202 may be configured to individually perform the primary NRFs 112 and the secondary NRFs 114.

The process 700 continues at operation 710, where the server 102 establishes the communication session between the first network component, the second network component, and the third network component. Herein, the server 102 establish individual or shared communication sessions with the primary NRFs 112 and the secondary NRFs 114. At operation 712, the first network component exchanges multiple connectivity signals with the second network component and the third network component. In this case, the connectivity signals include establishing communication links to perform multiple operation sessions such as those discussed in reference to session operation 612 of FIG. 6. At operation 714, the second network component performs multiple session operations in response to the connectivity signals received from the first network component. The session operations may comprise providing and receiving communications associated with routing and configuring information for the one or more core network components 202. At operation 716, the second network component reports to the third network component that the session operations are performed. At this stage, the primary NRF 112A provides one or more reports to the secondary NRF 114A that the session operations were performed between the AMF 154 and the primary NRF 112A.

At operation 720, the server 102 may determine whether the communication session is lost between the first network component and the second network component. The server 102 determines that that an interruption (e.g., the NRF interruption 620 of FIG. 6) caused the communication session between the AMF 154 and the primary NRF 112A were lost. If the communication session is not lost (i.e., NO), the process 700 returns to operation 712. If the communication session is lost (i.e., YES), the process 700 proceeds to operation 722.

The process 700 ends at operation 722, where the server 102 maintains the communication session between the first network component and the third network component. As a result, downtime in the core network 106 is reduced, prevented, or eliminated because the AMF 154 may pick up session operations with the secondary NRF 114A after a communication session with the primary NRF 112A is lost.

Operational Flow to Reduce Database Interruptions

FIG. 8 illustrates an operation flow 800 performed to reduce, to prevent, or to eliminate database interruptions in the SBA, in accordance with one or more embodiments. As a non-limiting example, the operation flow 800 is performed via the server 102 operating as part of the network element 101C performing the AMF 154 and in communicatively coupling with at least one of the core network components 202 performing one or more of the CNFs 150, the one or more SCPs 156, and the one or more primary NRFs 112, at least one network component providing the primary database 116A (e.g., the network component 101B), at least one network component performing the secondary database 118A (e.g., the network component 101B), at least one network component performing one or more additional primary databases 802 (e.g., the primary database 116B and the primary database 116C), and at least one network component performing one or more additional secondary databases 804 (e.g., the secondary database 118B and the secondary database 118C). In some embodiments, the operation flow 800 comprises reducing, preventing, or eliminating database interruptions by maintaining communication sessions with the secondary database 118A when in the event that the primary database 116A is lost due to a database interruption. In some embodiments, the database interruptions are events in which any one of the databases 116/118 cannot be accessed in relation to the core network 106.

In some embodiments, while the primary database 116A is used as a reference for the operation flow 800, the primary database 116B or the database 116C may perform any of the operations described herein in association with the primary database 116A. In other embodiments, while the secondary database 118A is used as a reference for the operation flow 800, the secondary database 118B or the secondary database 118C may perform any of the operations described herein in association with the secondary database 118A.

Establish Access to a Primary Database and a Secondary Database

In one or more embodiments, the operation flow 800 starts when the network component 101D performing one of the CNFs 150 communicates with the network component 101E performing the SCP 156 and the network component 101C performing the AMF 154 to access the primary database 116A and the database NRF 114A hosted by the network component 101B. The CNFs 150 may establish a communication session (e.g., shown as session establishment 810) with both the primary database 116A and the secondary database 118A. In this communication session, the AMF 154 may receive information and data components stored in the primary database 116A while maintaining an active (e.g., open) communication link with both the primary database 116A and the secondary database 118A. In the communication link, the AMF 154 may perform one or more database operations 812 with the primary database 116A where the primary database 116A establishes routing and configuration information for NFs in the core network 106 and any user equipment 110 attempting to access services from the core network 106. At this stage, the server 102 in the AMF 154 may be configured to request access to routing and configuration information stored in the primary database 116A to route and configure access to one or more services in the core network 106. Concurrently, the SMF 152 may exchange connectivity signals with the primary database 116A to provide connection registration data via a connection registration and eventually establish a PDU with one or more of the data networks 104. The routing and configuration commands from the primary database 116A may be saved as the configuration commands 142 in the server 102. During the communication session, the primary database 116A may be configured to store information associated with one or more of the primary NRFs 112 and dynamically update the configuration commands 142 at the server 102.

In one or more embodiments, the primary database 116A may provide the secondary database 118A with a report in which the database operations 812 are copied. The report may be a string of data, a sequence of data packets, or a confirmation signal acknowledging that a service is provided to the rest of the core network 106. The server 102 may assume that all database operations 812 performed via the primary database 116A are reported to the secondary database 118A. In some embodiments, the primary database 116A and the secondary database 118A may not be performed by the same network component 101B. In some embodiments, the database operations 814 are further reported as copied operations 816 between the primary database 116A and the additional primary databases 802. In other embodiments, the database operations 814 are further reported as copied operations 818 between the secondary database 118A and the additional secondary databases 804. Similar to the report of operations 814, the copied operations 816-818 may be data strings, sequences of data packets, or signal confirmations acknowledging that one or more services are provided to the rest of the core network 106.

Loss of Access to the Primary Database

In one or more embodiments, the communication session to the primary database 116A may be lost due to a database interruption 820. The database interruption 820 may be caused by a disconnection of the primary database 116A from the core network 106. In this regard, the network element 101B performing the primary database 116A may be unable to connect to the communication bus 210 in the core network 106. In some embodiments, the database interruption 820 may comprise that the network component 101B is disconnected from the SBA or that the network component 101B is unable to continue providing access to the primary database 116A causing a database to be lost (e.g., session lost 830). To identify or confirm that the database interruption 820 occurred in the core network 106, the server 102 may be configured to identify or confirm that certain connectivity signals are not received from the network component 101B. The certain connectivity signals may comprise periodic connection feedback received from the primary database 114A or expected periodic signaling (e.g., to update the configuration commands 142).

If the certain connectivity signals are not received from the primary database 116A, then the server 102 may be configured to perform one or more reconnection attempts in which the AMF 154 and one or more additional core network components 202 request one or more connectivity signals from the primary database 116A to check for a connection. If a response is not received and there are failed reconnections 840 as a result, the server 102 may be configured to determine or confirm that the database interruption 820 occurred. Concurrently, and similar to the failed reconnections 840, the secondary database 118A may identify that the primary database 116A has undergone the interruption 820 if the report operations 814 are not received and one or more reported operations are missing (e.g., one or more missing report operations 850).

Maintain Access to the Secondary Database

In one or more embodiments, upon identifying that the primary database 116A is disconnected or irresponsive due to the database interruption 820, the server 102 may be configured to maintain a communication session with the secondary network component even if the communication session with the primary database 116A is lost. At this stage, the core network 106 relies on the secondary database 118A until a connection with the primary database 116A is restored. The secondary database 118A may perform one or more database operations 860 with the core network 106. After the database operations 860 are performed, the secondary database 118A may transmit a copy of the database operations to the additional primary databases 802 (e.g., copy operations 862) and the additional secondary databases 804 (e.g., copy operations 864).

Example Process to Reduce Database Interruptions

FIG. 9 illustrates an example flowchart of a process 900 to reduce, to prevent, or to eliminate database interruptions (e.g., the database interruption 820 of FIG. 8) in the SBA, in accordance with one or more embodiments. In one or more embodiments, the process 900 comprises reducing, preventing, or eliminating database interruptions by controlling backup databases (e.g., the network component 101B operating the secondary databases 118) to maintain information associated with communication sessions in the event that an initial communication session is lost. In some embodiments, the database interruptions are events in which the database operations cannot be performed in relation to the network.

The process 900 starts at operation 902, where the server 102 generates a request to establish a communication session in which a network component accesses a first database and a second database. The network component may be the network component 101C performing the AMF 154. The first database may be the primary database 116A in the network component 101B. The second database may be the secondary database 118A in the network component 101B. In some embodiments, two or more different network components of the core network components 202 may be configured to individually contain the primary databases 116 and the secondary databases 118. Herein, the server 102 establish individual or shared communication sessions with the primary databases 116 and the secondary databases 118.

The process 900 continues at operation 910, where the server 102 establishes the communication session to access the first database and the second database. Herein, the server 102 establish individual or shared communication sessions to access the primary databases 116 and the secondary databases 118. At operation 912, the network component exchanges multiple connectivity signals with the first database and the second database. In this case, the connectivity signals include establishing communication links to access database information and perform database operations such as those discussed in reference to database operation 812 of FIG. 6. At operation 914, the first database provides multiple database operations in response to the connectivity signals exchanged with the first database. The database operations may comprise providing and receiving communications associated with obtaining database information including routing and configuring information for the one or more core network components 202. At operation 916, the first database reports to the second database that the database operations are provided. At this stage, the primary database 116A provides one or more reports to the secondary database 118A that the database operations were performed between the AMF 154 and the primary database 116A.

At operation 920, the server 102 may determine whether the access is lost between the network component and the first database. The server 102 determines that that an interruption (e.g., the database interruption 820 of FIG. 8) caused the communication session between the AMF 154 and the primary database 116A were lost. If the access is not lost (i.e., NO), the process 900 returns to operation 912. If the access is lost (i.e., YES), the process 900 proceeds to operation 922.

The process 900 ends at operation 922, where the server 102 maintains the access between the network component and the second database. As a result, downtime in the core network 106 is reduced, prevented, or eliminated because the AMF 154 may pick up database operations with the secondary database 118A after a communication session with the primary database 116A is lost.

Example Processes

FIGS. 5, 7, and 9 illustrate respective example flowcharts of the process 500, the process 700, or the process 900, in accordance with one or more embodiments. Modifications, additions, or omissions may be made to the process 500, the process 700, or the process 900. The process 500, the process 700, or the process 900 may include more, fewer, or other operations than those shown above. For example, operations may be performed in parallel or in any suitable order. While at times discussed as the server 102, one or more of the network components 101A-101E, one or more of the core network components 202, or components of any of thereof performing operations described in the operations, any suitable system or components of the security system 100 may perform one or more operations of the process 500, the process 700, or the process 900. For example, one or more operations of the process 500, the process 700, or the process 600 may be implemented, at least in part, in the form of server instructions 136 of FIG. 1, stored on non-transitory, tangible, machine-readable media (e.g., server memory 134 of FIG. 1) that when run by one or more processors (e.g., the server processor 122 of FIG. 1) may cause the one or more processors to perform operations described in operations 502-512, operations 702-722, or operations 902-922.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus in a service-based architecture, comprising:
    one or more interfaces configured to communicatively couple the apparatus to a first network component, a second network component, and a third network component, wherein:
        the first network component is associated with a Session Management Function (SMF);
        the second network component is associated with a Network Repository Function (NRF);
        the third network component is associated with an Access and Mobility Function (AMF); and
        the apparatus is located within the third network component;
    a memory communicatively coupled to the one or more interfaces and configured to store:
        a plurality of configuration commands configured to establish one or more communication sessions between two or more network components of a plurality of network components comprising the first network component, the second network component, and the third network component; and
    a processor communicatively coupled to the memory and configured to:
        generate a request to establish a communication session between the first network component of the plurality of network components, the second network component of the plurality of network components, and the third network component of the plurality of network components;
        establish the communication session between the first network component, the second network component, and the third network component based at least in part upon a first configuration command of the plurality of configuration commands, wherein, concurrently with the communication session:

the third network component exchanges a first plurality of connectivity signals with the first network component and the second network component;
the first network component performs a first plurality of session operations in response to the first plurality of connectivity signals exchanged with the third network component; and
the first network component reports to the third network component that the first plurality of session operations are performed;
determine whether the communication session is lost between the third network component and the first network component based at least in part upon identifying an interruption in the communication session; and
in response to determining that the communication session between the third network component and the first network component is lost, maintain the communication session between the third network component and the second network component.

2. The apparatus of claim 1, wherein, concurrently with maintaining the communication session between the third network component and the second network component:
the third network component exchanges a second plurality of connectivity signals with the second network component; and
the second network component performs a second plurality of session operations in response to the second plurality of connectivity signals received from the third network component.

3. The apparatus of claim 1, wherein the processor is further configured to:
determine a first connectivity signal of the first plurality of connectivity signals to be received by the third network component from the second network component;
in response to determining that the first plurality of connectivity signals are interrupted from being received by the third network component, attempt to reestablish the communication session between the third network component and the second network component based at least in part upon a second configuration command of the plurality of configuration commands; and
in response to a failed attempt to reestablish the communication session, determine that the communication session is lost.

4. The apparatus of claim 1, wherein, concurrently with the communication session:
the second network component transmits a first copy of the first plurality of session operations performed to a fourth network component and a fifth network component; and
the third network component transmits a second copy of the first plurality of session operations performed to a sixth network component and a seventh network component.

5. The apparatus of claim 4, wherein, in the service-based architecture:
the first network component and the second network component are associated with a first plurality of providers communicating to a first plurality of users in a first availability zone;
the fourth network component and the fifth network component are associated with a second plurality of providers communicating to a second plurality of users in a second availability zone; and
the sixth network component and the seventh network component are associated with a third plurality of providers communicating to a third plurality of users in a third availability zone.

6. The apparatus of claim 4, wherein:
the fourth network component is configured to perform a second primary NRF;
the fifth network component is associated with a second secondary NRF;
the sixth network component is associated with a third primary NRF; and
the seventh network component is associated with a third secondary NRF.

7. The apparatus of claim 6, wherein:
the interruption indicates that the second network component is disconnected from the service-based architecture.

8. The apparatus of claim 6, wherein:
the interruption indicates that the second network component is paused from performing the NRF.

9. A system in a service-based architecture, comprising:
a first network component comprising a first processor configured to perform a Session Management Function (SMF);
a second network component comprising a second processor configured to perform a Network Repository Function (NRF); and
a third network component configured to perform an Access and Mobility Function (AMF), the third network component comprising:
a memory configured to store:
a plurality of configuration commands configured to establish one or more communication sessions between two or more network components of a plurality of network components; and
a third processor communicatively coupled to the memory and configured to:
generate a request for establishing a communication session between the first network component of the plurality of network components, the second network component of the plurality of network components, and the third network component of the plurality of network components;
establish the communication session between the first network component, the second network component, and the third network component based at least in part upon a first configuration command of the plurality of configuration commands, wherein, concurrently with the communication session:
the third network component exchanges a first plurality of connectivity signals with the first network component and the second network component;
the first network component performs a first plurality of session operations in response to the first plurality of connectivity signals exchanged with the third network component; and
the first network component reports to the second network component that the first plurality of session operations are performed;
determine whether the communication session is lost between the third network component and the first network component based at least in part upon identifying an interruption in the communication session; and in response to determining that the communication session between the third network component and the first network component is lost, maintain the communication session between the third network component and the second network component.

10. The system of claim 9, wherein, concurrently with maintaining the communication session between the third network component and the second network component:
the third network component exchanges a second plurality of connectivity signals with the second network component; and
the second network component performs a second plurality of session operations in response to the second plurality of connectivity signals received from the third network component.

11. The system of claim 9, wherein the third processor is further configured to:
determine a first connectivity signal of the first plurality of connectivity signals to be received by the third network component from the second network component;
in response to determining that the first plurality of connectivity signals are interrupted from being received by the third network component, attempt to reestablish the communication session between the third network component and the second network component based at least in part upon a second configuration command of the plurality of configuration commands; and
in response to a failed attempt to reestablish the communication session, determine that the communication session is lost.

12. The system of claim 9, wherein, concurrently with the communication session:
the second network component transmits a first copy of the first plurality of session operations performed to a fourth network component and a fifth network component; and
the third network component transmits a second copy of the first plurality of session operations performed to a sixth network component and a seventh network component.

13. The system of claim 12, wherein, in the service-based architecture:
the first network component and the second network component are associated with a first plurality of providers communicating to a first plurality of users in a first availability zone;
the fourth network component and the fifth network component are associated with a second plurality of providers communicating to a second plurality of users in a second availability zone; and
the sixth network component and the seventh network component are associated with a third plurality of providers communicating to a third plurality of users in a third availability zone.

14. The system of claim 12, wherein:
the fourth network component performs a second primary NRF;
the fifth network component performs a second secondary NRF;
the sixth network component performs a third primary NRF; and
the seventh network component performs a third secondary NRF.

15. A method performed by an apparatus communicatively coupled to a plurality of network components in a service-based architecture, comprising:
generating a request for establishing a communication session between a first network component of the plurality of network components, a second network component of the plurality of network components, and a third network component of the plurality of network components, wherein:
the first network component is associated with a Session Management Function (SMF);
the second network component is associated with a Network Repository Function (NRF); and
the third network component is associated with an Access and Mobility Function (AMF);
establishing the communication session between the first network component, the second network component, and the third network component based at least in part upon a first configuration command of a plurality of configuration commands, wherein:
the plurality of configuration commands is configured to establish one or more communication sessions between two or more network components of the plurality of network components; and
concurrently with the communication session:
the third network component exchanges a first plurality of connectivity signals with the first network component and the second network component;
the first network component performs a first plurality of session operations in response to the first plurality of connectivity signals exchanged with the third network component; and
the first network component reports to the third network component that the first plurality of session operations are performed;
determining whether the communication session is lost between the third network component and the first network component based at least in part upon identifying an interruption in the communication session; and
in response to determining that the communication session between the third network component and the first network component is lost, maintaining the communication session between the third network component and the second network component.

16. The method of claim 15, wherein, concurrently with maintaining the communication session between the third network component and the second network component:
the third network component exchanges a second plurality of connectivity signals with the second network component; and
the second network component performs a second plurality of session operations in response to the second plurality of connectivity signals received from the third network component.

17. The method of claim 15, further comprising:
determining a first connectivity signal of the first plurality of connectivity signals to be received by the third network component from the second network component;
in response to determining that the first plurality of connectivity signals are interrupted from being received by the third network component, attempting to reestablish the communication session between the third network component and the second network component based at least in part upon a second configuration command of the plurality of configuration commands; and in response to a failed attempt to reestablish the communication session, determining that the communication session is lost.

18. The method of claim 15, further comprising:

the second network component transmits a first copy of the first plurality of session operations performed to a fourth network component and a fifth network component; and the third network component transmits a second copy of the first plurality of session operations performed to a sixth network component and a seventh network component.

19. The method of claim 18, wherein, in the service-based architecture:

the first network component and the second network component are associated with a first plurality of providers communicating to a first plurality of users in a first availability zone;

the fourth network component and the fifth network component are associated with a second plurality of providers communicating to a second plurality of users in a second availability zone; and the sixth network component and the seventh network component are associated with a third plurality of providers communicating to a third plurality of users in a third availability zone.

20. The method of claim 18, wherein:

the fourth network component is a fourth electronic component associated with a second primary NRF;

the fifth network component is a fifth electronic component associated with a second secondary NRF;

the sixth network component is a sixth electronic component associated with a third primary NRF; and the seventh network component is a seventh electronic component associated with a third secondary NRF.

* * * * *